(12) United States Patent
Shibata et al.

(10) Patent No.: US 9,906,524 B2
(45) Date of Patent: Feb. 27, 2018

(54) SERVER, PROVISION DEVICE, AND ONE-TIME PASSWORD GENERATION DEVICE

(71) Applicant: THE BANK OF TOKYO-MITSUBISHI UFJ, LTD., Tokyo (JP)

(72) Inventors: Makoto Shibata, Tokyo (JP); Shinji Kurokawa, Tokyo (JP); Yuji Kitada, Tokyo (JP); Atsuo Ikeya, Tokyo (JP); Takeshi Iketani, Tokyo (JP)

(73) Assignee: THE BANK OF TOKYO-MITSUBISHI UFJ, LTD., Tokyo (JP)

( * ) Notice: Subject to any disclaimer, the term of this patent is extended or adjusted under 35 U.S.C. 154(b) by 0 days.

(21) Appl. No.: 15/251,477

(22) Filed: Aug. 30, 2016

(65) Prior Publication Data

US 2016/0373435 A1     Dec. 22, 2016

Related U.S. Application Data

(63) Continuation of application No. PCT/JP2016/055022, filed on Feb. 22, 2016.

(30) Foreign Application Priority Data

Apr. 3, 2015  (JP) ................. 2015-076837

(51) Int. Cl.
*H04L 29/06* (2006.01)
*G06F 21/31* (2013.01)
(Continued)

(52) U.S. Cl.
CPC .......... *H04L 63/0838* (2013.01); *G06F 21/31* (2013.01); *G06F 21/32* (2013.01);
(Continued)

(58) Field of Classification Search
CPC ... H04L 63/0838; H04L 63/0853; H04L 9/32; H04L 9/3228; G06F 21/31; G06F 21/32;
(Continued)

(56) References Cited

U.S. PATENT DOCUMENTS 6,259,909 B1 * 7/2001 Ratayczak .............. G06F 21/35
                                                        455/410
8,751,801 B2 * 6/2014 Harris ..................... G06F 21/31
                                                        713/168

(Continued)

FOREIGN PATENT DOCUMENTS

JP    H10-149400 A    6/1998
JP    2004-272827 A   9/2004
(Continued)

OTHER PUBLICATIONS

Japanese Office Action dated May 24, 2016 for the corresponding Japanese Application No. 2016-088661.
(Continued)

*Primary Examiner* — Minh Dinh
(74) *Attorney, Agent, or Firm* — Typha IP LLC

(57) ABSTRACT

Realized is a low-cost provision system capable of providing a provision item or a provision system that requires a smaller number of operation steps to be made by a user. A server includes a first receiving unit receiving transaction information transmitted by a communication terminal requesting a provision device having a provision item stored thereon to make a transaction of the provision item, a second receiving unit receiving a communication result including authentication information input to the communication terminal before the communication, the communication result being generated by a communication between the provision device and the communication terminal, and a transmission unit transmitting an instruction to execute the transaction to the
(Continued)

provision device based on the transaction information or the communication result.

11 Claims, 23 Drawing Sheets

(51) Int. Cl.
| | |
|---|---|
| *G06F 21/32* | (2013.01) |
| *G06F 21/46* | (2013.01) |
| *G06Q 20/18* | (2012.01) |
| *G06Q 20/40* | (2012.01) |
| *H04L 9/32* | (2006.01) |
| *G06F 21/35* | (2013.01) |
| *G06Q 20/10* | (2012.01) |
| *G06Q 20/32* | (2012.01) |

(52) U.S. Cl.
CPC .............. *G06F 21/35* (2013.01); *G06F 21/46* (2013.01); *G06Q 20/1085* (2013.01); *G06Q 20/18* (2013.01); *G06Q 20/3223* (2013.01); *G06Q 20/40* (2013.01); *H04L 9/32* (2013.01); *G06F 2221/2137* (2013.01); *H04L 63/0492* (2013.01)

(58) Field of Classification Search
CPC ......... G06F 21/35; G06F 21/46; G06Q 20/18; G06Q 20/32; G06Q 20/322; G06Q 20/3221; G06Q 20/3223; G06Q 20/327; G06Q 20/40; G07F 19/00; G07F 19/20; G07D 13/00

See application file for complete search history.

(56) References Cited

U.S. PATENT DOCUMENTS

| | | | | |
|---|---|---|---|---|
| 2015/0215310 | A1* | 7/2015 | Gill | H04L 63/0853 726/7 |
| 2016/0379211 | A1* | 12/2016 | Hoyos | H04L 63/0823 705/75 |

FOREIGN PATENT DOCUMENTS

| | | |
|---|---|---|
| JP | 2004-303057 A | 10/2004 |
| JP | 2007-004478 A | 1/2007 |
| JP | 2007-249781 A | 9/2007 |
| JP | 2007-257496 A | 10/2007 |
| JP | 2008-234316 A | 10/2008 |
| JP | 2013-008086 A | 1/2013 |

OTHER PUBLICATIONS

Japanese Office Action dated Mar. 29, 2016 for the corresponding Japanese Application No. 2015-076837.
ISR and Written Opinion for the PCT Application No. PCT/JP2016/055022 dated Mar. 30, 2016.
Japanese Notice of Allowance dated Sep. 13, 2016, for the corresponding Japanese Application No. 2016-088661. With Partial Translation.
Translation of Japanese Office Action dated Mar. 29, 2016 for the corresponding Japanese Application No. 2015-076837.
Translation of the International Search Report and partial translation of the Written Opinion for PCT Application No. PCT/JP2016/055022.

* cited by examiner

SERVER, PROVISION DEVICE, AND ONE-TIME PASSWORD GENERATION DEVICE

CROSS-REFERENCE TO RELATED APPLICATIONS

This application is based upon and claims the benefit of priority from the prior Japanese Patent Application No. 2015-076837, filed on Apr. 3, 2015, and PCT Application No. PCT/JP2016/055022, filed on Feb. 22, 2016, the entire contents of which are incorporated herein by reference.

FIELD

The present invention relates to a server, a provision device, and a one-time password generation device that are usable for a provision system providing a provision item such as a tangible item, electronic data or the like.

BACKGROUND

Today, an automated teller machine (ATM) allowing a financial transaction such as cash deposit, cash withdrawal, money transfer or the like to be performed automatically is in common use. Such an ATM does not require an operator to perform a procedure at the teller window and enables the operator to perform a financial transaction easily and quickly.

A currently common ATM system needs to be operated by an operator for a transaction. Therefore, the ATM is occupied by the operator during the transaction. There is a tendency that many users use ATMs to withdraw cash in certain time slots, for example, during a lunch break. In the case where the number of ATMs is smaller for the number of users at such a peak time, bank queues become long. As a result, the users need to wait for a very long time until using the ATM to withdraw cash.

In order to prevent an illegal withdrawal of cash, some ATMs may have a function of confirming that the user operating the ATM matches the holder of the account that is the target of transaction. For example, Japanese Laid-Open Patent Publication No. 2008-171218 describes a technology for preventing an illegal withdrawal at the ATM. According to this technology, the user operating the ATM is checked against the holder of the account that is the target of transaction by a communication between the communication terminal of the user and the ATM, and thus the user is authenticated.

However, the technology of Japanese Laid-Open Patent Publication No. 2008-171218 requires the user to operate the ATM as is conventionally needed. Therefore, the time needed to complete the transaction is the same as by the conventional art.

The present invention made in light of such a problem has an object of providing a provision system that requires a smaller number of operation steps to be made on a provision device by a user.

SUMMARY

A server in an embodiment according to the present invention includes a first receiving unit receiving transaction information transmitted by a communication terminal requesting a provision device having a provision item stored thereon to make a transaction of the provision item, a second receiving unit receiving a communication result including authentication information input to the communication terminal before the communication, the communication result being generated by a communication between the provision device and the communication terminal, and a transmission unit transmitting an instruction to execute the transaction to the provision device based on the transaction information or the communication result.

In another embodiment, the server may further include a determination unit determining whether or not to permit the transaction based on the transaction information or the communication result.

In still another embodiment, the second receiving unit may receive the communication result including device identification information on the provision device received by the communication terminal from the provision device, and the determination device may determine whether or not to permit the transaction based on the transaction information or the device identification information.

In still another embodiment, the second receiving unit may receive the communication result including terminal identification information on the communication terminal received by the provision device from the communication terminal, and the determination device may determine whether or not to permit the transaction based on the transaction information or the terminal identification information.

In still another embodiment, the server may further include a one-time password generation unit generating a one-time password in response to a one-time password generation request made by the communication terminal, and a one-time password transmission unit transmitting the one-time password to the communication terminal. The second receiving unit may receive the one-time password received by the communication terminal via the provision device, and the determination device may determine whether or not to permit the transaction based on the transaction information or the one-time password.

In still another embodiment, the server may further include a one-time password generation unit generating a one-time password in response to a one-time password generation request made by the communication terminal, and a one-time password transmission unit transmitting the one-time password to the provision device. The second receiving unit may receive the one-time password received by the provision device via the communication terminal, and the determination device may determine whether or not to permit the transaction based on the transaction information or the one-time password.

In still another embodiment, the second receiving unit may receive inherent information of the communication terminal together with the one-time password.

In still another embodiment, the determination unit may determine, based on the inherent information, whether or not to permit the transaction based on a determination on whether or not the communication terminal having transmitted the transaction information is identical to the communication terminal having transmitted the one-time password.

In still another embodiment, the one-time password generation unit may generate the one-time password having a one-time password length varying in accordance with the transaction information.

In still another embodiment, the provision item is a banknote or a coin, and the one-time password generation unit may generate a one-time password having a greater one-time password length as the amount of money provided by the banknotes or the coins to be transacted is greater.

In still another embodiment, the one-time password generation unit may generate the one-time password having a validity term varying in accordance with the transaction information.

In still another embodiment, the one-time password generation unit may generate the one-time password having a validity term in accordance with a request made by the communication terminal.

In still another embodiment, the communication terminal may include a biological information receiving unit receiving user biological information acquired from a user of the communication terminal, and the determination unit may determine whether or not to permit the transaction based on the transaction information or the user biological information.

In still another embodiment, the communication terminal may be a wearable computer.

A server in an embodiment according to the present invention includes a first receiving unit receiving transaction information transmitted by a communication terminal requesting a provision device having a provision item stored thereon to make a transaction of the provision item, a one-time password generation unit generating, in response to a one-time password generation request made by the communication terminal, a one-time password having a length varying in accordance with the transaction information, a one-time password transmission unit transmitting the one-time password to one of the communication terminal and the provision device, a second receiving unit receiving the one-time password received by the one of the communication terminal and the provision device via the other of the communication terminal and the provision device, and a transmission unit transmitting an instruction to execute the transaction to the provision device based on the transaction information or the one-time password.

A server in an embodiment according to the present invention includes a first receiving unit receiving transaction information transmitted by a communication terminal requesting a provision device having a provision item stored thereon to make a transaction of the provision item, a one-time password generation unit generating, in response to a one-time password generation request made by the communication terminal, a one-time password having a validity term varying in accordance with the transaction information, a one-time password transmission unit transmitting the one-time password to one of the communication terminal and the provision device, a second receiving unit receiving the one-time password received by the one of the communication terminal and the provision device via the other of the communication terminal and the provision device, and a transmission unit transmitting an instruction to execute the transaction to the provision device based on the transaction information or the one-time password.

A server in an embodiment according to the present invention includes a first receiving unit receiving transaction information transmitted by a communication terminal requesting a provision device having a provision item stored thereon to make a transaction of the provision item, a one-time password generation unit generating, in response to a one-time password generation request and a validity term setting request made by the communication terminal, a one-time password having a different validity term, a one-time password transmission unit transmitting the one-time password to one of the communication terminal and the provision device, a second receiving unit receiving the one-time password received by the one of the communication terminal and the provision device via the other of the communication terminal and the provision device, and a transmission unit transmitting an instruction to execute the transaction to the provision device based on the transaction information or the one-time password.

A provision device in an embodiment according to the present invention includes a storage unit having a provision item stored thereon, a communication unit making a communication with a communication terminal having requested a transaction of the provision item, and a provision unit providing the provision item to a user operating the communication terminal based on transaction information transmitted by the communication terminal or a communication result including authentication information input to the communication terminal before the communication.

In still another embodiment, the communication unit may transmit device identification information on the provision device to the communication terminal, and the provision unit may provide the provision item to the user operating the communication terminal based on the transaction information or the device identification information.

In still another embodiment, the communication unit may receive terminal identification information from the communication terminal, and the provision unit may provide the provision item to the user operating the communication terminal based on the transaction information or the terminal identification information.

In still another embodiment, the communication terminal may receive a one-time password, generated by a server based on a one-time password generation request made by the communication terminal, from one of the communication terminal and the server, and transmit the received one-time password to the other of the communication terminal and the server. The provision unit may provide the provision item to a user operating the communication terminal based on the transaction information or the one-time password.

In still another embodiment, the provision device may further include a display unit displaying a one-time password generated by a server in response to a one-time password generation request made by the communication terminal. The provision unit may provide the provision item to a user operating the communication terminal based on the transaction information or the one-time password.

A one-time password generation device in an embodiment according to the present invention includes a one-time password generation unit generating, in response to a one-time password generation request made by a communication terminal, a one-time password having a one-time password length varying in accordance with input information input to the communication terminal, and a one-time password transmission unit transmitting the one-time password to the communication terminal or a one-time password display device.

In still another embodiment, the input information may include information specifying the one-time password length.

A one-time password generation device in an embodiment according to the present invention includes a one-time password generation unit generating, in response to a one-time password generation request made by a communication terminal, a one-time password having a validity term varying in accordance with input information input to the communication terminal, and a one-time password transmission unit transmitting the one-time password to the communication terminal or a one-time password display device.

In still another embodiment, the input information may include information specifying the validity term.

In still another embodiment, the one-time password generation unit may generate a one-time password having a one-time password length varying in accordance with the input information.

In still another embodiment, the input information may include information specifying the one-time password length.

REFERENCE SIGNS LIST

Figure 1:
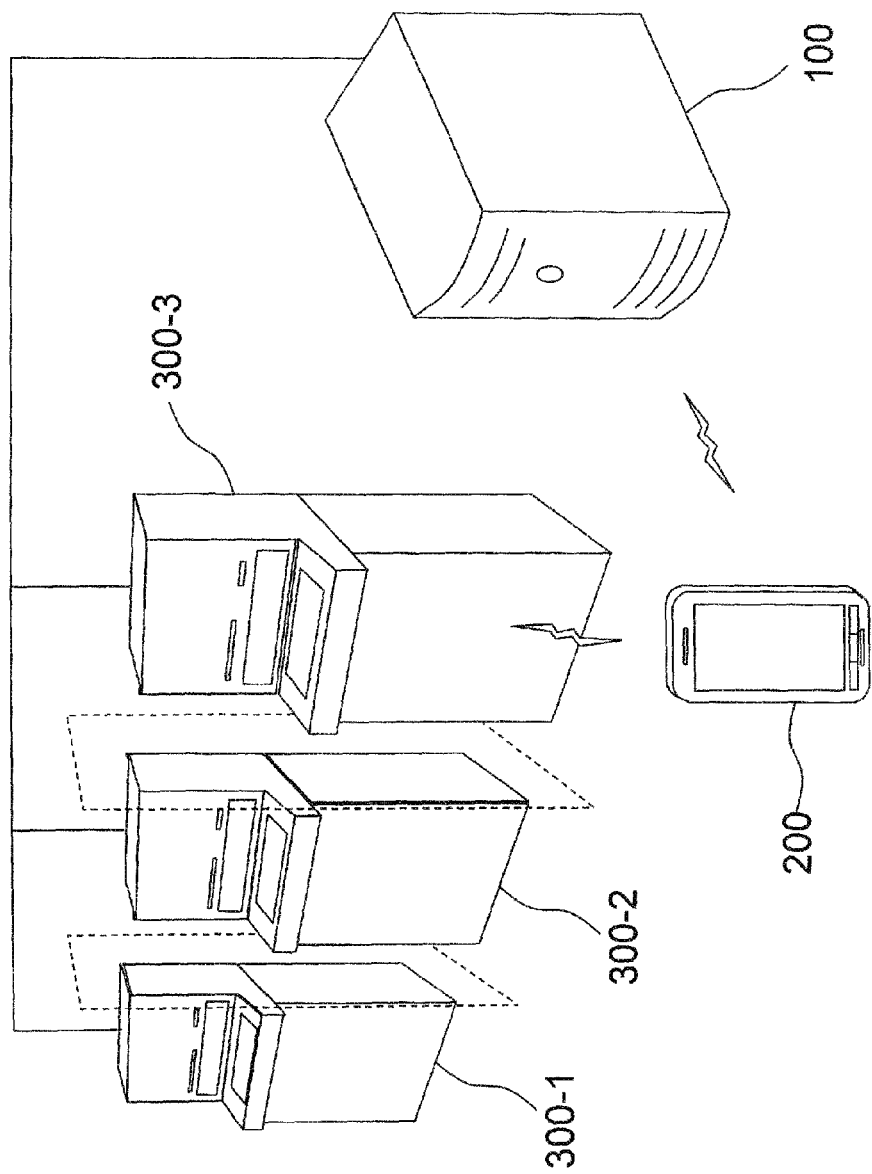
FIG. 1 shows an overview of a provision system in an embodiment according to the present invention.

10: Provision system; 100: Provision server; 110: Server control unit; 120: Server storage unit; 130: Server communication unit; 142: First server receiving unit; 144: Second server receiving unit; 146: Determination unit; 148: Server transmission unit; 150: OTP generation unit; 152: OTP transmission unit; 154: Biological information receiving unit; 200: Communication terminal; 205: Terminal storage unit; 210: Terminal control unit; 215: First terminal communication unit; 220: Second terminal communication unit; 230: Display; 240: Operation buttons; 240B: Operation unit; 250: Speaker; 260: Microphone; 272: Terminal receiving unit; 274: First terminal transmission unit; 276: Second terminal transmission unit; 278: Terminal display unit; 280: Biological information acquisition unit; 300: Provision device; 310: Storage unit; 320: Device communication unit; 330: Provision unit; 340: Device display unit; 350: Device operation unit; 360: Housing; 372: First device receiving unit; 374: Second device receiving unit; 376: First device transmission unit; 378: Second device transmission unit; 380: Device display unit; 400: Database; 500: Network; 700: Interface; 710: Transaction amount input box; 715C: Validity term setting box; 720: OTP generation request button; 730: OTP display area; and 740: OTP validity term display area.

DESCRIPTION OF EMBODIMENTS

A provision system, and a server, a provision device and a communication terminal usable for the provision system, and also a program usable to operate the provision system, the server, the provision device and the communication terminal, all according to the present invention, will be described with reference to the drawings. The provision system, the server, the provision device, the communication terminal and the program may be carried out in any of many various embodiments, and are not to be construed as being limited to any of the following embodiments. In the figures referred to in the embodiments, elements that are the same as each other or having substantially the same functions as each other will bear the same reference numerals, and descriptions thereof will not be repeated.

Embodiment 1

With reference to FIG. 1 through FIG. 12, a provision system, and a server, a provision device and a communication terminal that are usable for the provision system, and also a program usable to operate the provision system, the server, the provision device and the communication terminal, all in embodiment 1 according to the present invention, will be described in detail. In embodiment 1, a provision device handling cash encompassing banknotes and coins as a provision item will be described. The provision device according to the present invention may be a device providing a user with a target item other than cash as a provision item. Examples of the provision item other than cash include tangible items such as a ticket, a coupon, a numbered ticket and the like, and intangible items such as a password, a procedure format, electronic money, an electronic ticket, client information and the like.

[Overview of the Provision System]

FIG. 1 shows an overview of a provision system in an embodiment according to the present invention. As shown in FIG. 1, a provision system 10 according to the present invention includes a provision server 100, a communication terminal 200, and provision devices 300 (300-1, 300-2, 300-3). In FIG. 1, the provision system 10 is shown as including a plurality of provision devices 300. The provision system 10 is not limited to this, and may include one provision device 300.

The communication terminal 200 communicates with the provision server 100 via the Internet. The communication terminal 200 directly communicates with each of the provision devices 300. The communication terminal 200 and each of the provision devices 300 may directly communicate with each other via near field communication or wired communication. The communication method will be described below in detail. Each provision device 300 is connected with the provision server 100 in a wired manner. In FIG. 1, each provision device 300 is shown as being connected with the provision server 100 in a wired manner. The provision device 300 is not limited to this, and may be connected with the provision server 100 in, for example, a wireless manner. In this case, each provision device 300 and the provision server 100 may be connected with each other via a dedicated network different from the Internet commonly used. The provision device 300 is a dispense-only device used only for cash withdrawal, and dispenses cash in accordance with the transaction made by the user.

Figure 2:
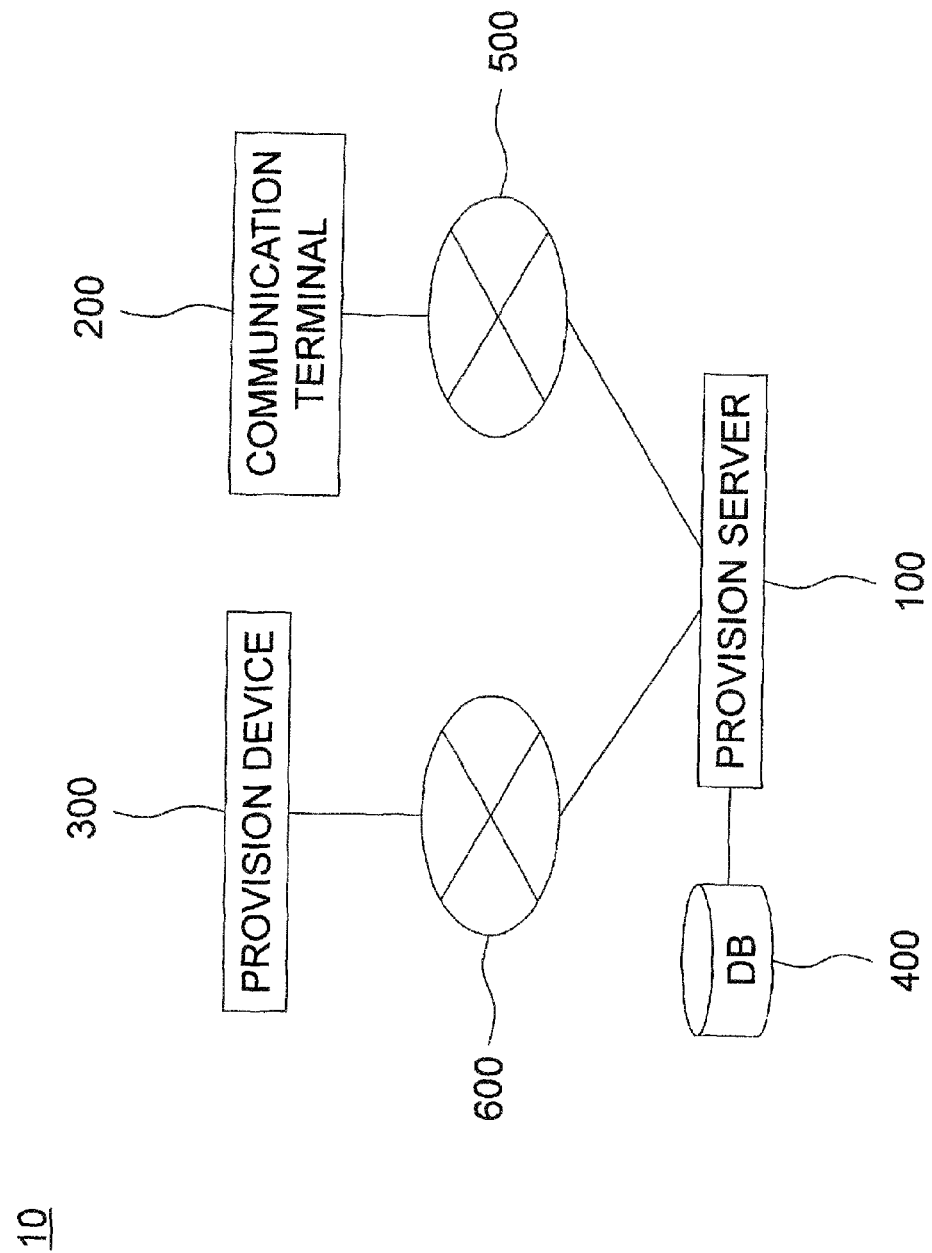
FIG. 2 is a block diagram showing an overview of the provision system in an embodiment according to the present invention.

FIG. 2 is a block diagram showing an overview of the provision system in an embodiment according to the present invention. As shown in FIG. 2, the provision server 100 is connected with a database 400. The provision server 100 is connected with the communication terminal 200 via a network 500. The provision server 100 is connected with the provision device 300 via a dedicated network 600. The database 400 includes account information (account number, branch name, name of the account holder), holder information (login ID, password), and provision device information (device identification number, branch in which the device is installed). The network 500 may be the World Wide Web (WWW), which is commonly used, or a local network such as an in-house LAN. The dedicated network 600 may be an in-house LAN for which security is set or a network using a radio wave not usable by the communication terminal 200.

In FIG. 2, the provision server 100 is shown as being directly connected with the database 400. The provision server 100 is not limited to this, and may be connected with the network 500 or the dedicated network 600. Namely, cloud computing, by which data storage is performed via a network, may be used instead of the database 400.

[Hardware Configuration of the Provision Serve 100]

Figure 3:
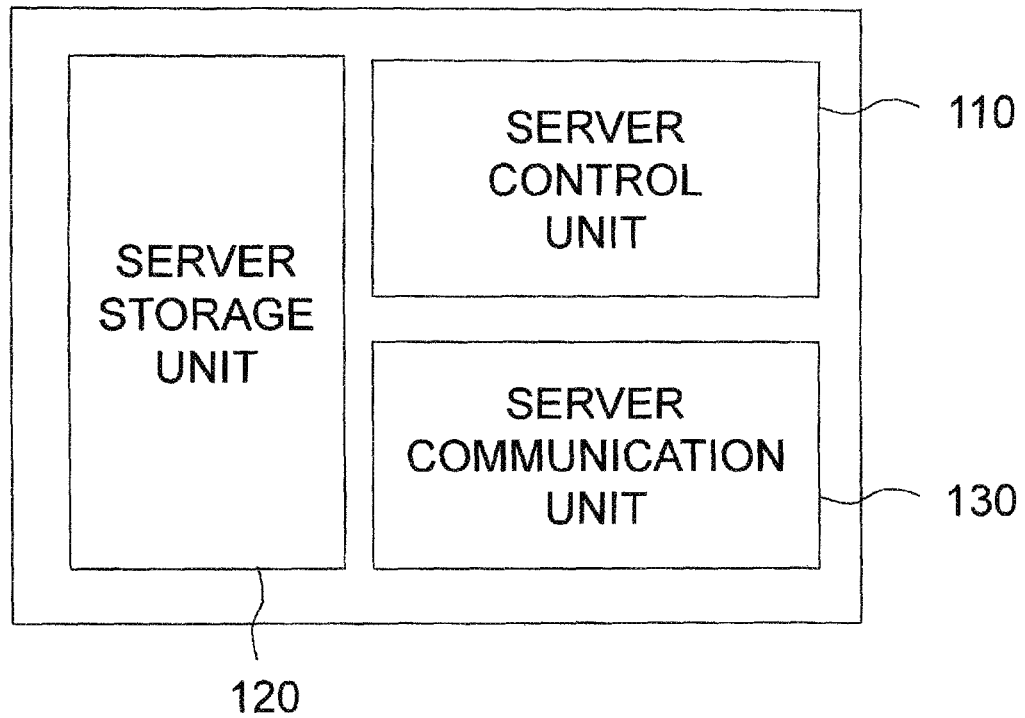
FIG. 3 is a schematic view showing a hardware configuration of a server usable for the provision system in an embodiment according to the present invention.

FIG. 3 is a schematic view showing a hardware configuration of the server usable for the provision system in an embodiment according to the present invention. As shown in FIG. 3, the provision server 100 includes a server control unit 110, a server storage unit 120, and a server communication unit 130.

The server control unit 110 includes a central processing unit (CPU), a storage unit such as a register, a memory or the like. The server control unit 110 executes, by the CPU, a program temporarily stored on the memory and performs a computation process in accordance with a command signal from the communication terminal 200.

The server storage unit 120 is a storage device capable of storing a large capacity of data, and stores a program or the like necessary for a computation process. The program stored on the server storage unit 120 is read by the server control unit 110 and temporarily stored on a storage unit of the server control unit 110. The server storage unit 120 stores information transmitted from the communication terminal 200. The server storage unit 120 may be a hard disc, or a volatile or nonvolatile memory.

The server communication unit 130 is a control device connectable with an external device such that data is transmitted thereto or received therefrom. The server communication unit 130 controls data transmission and receiving to and from the network 500 and the dedicated network 600.

[Hardware Configuration of the Provision Device 300]

Figure 4:
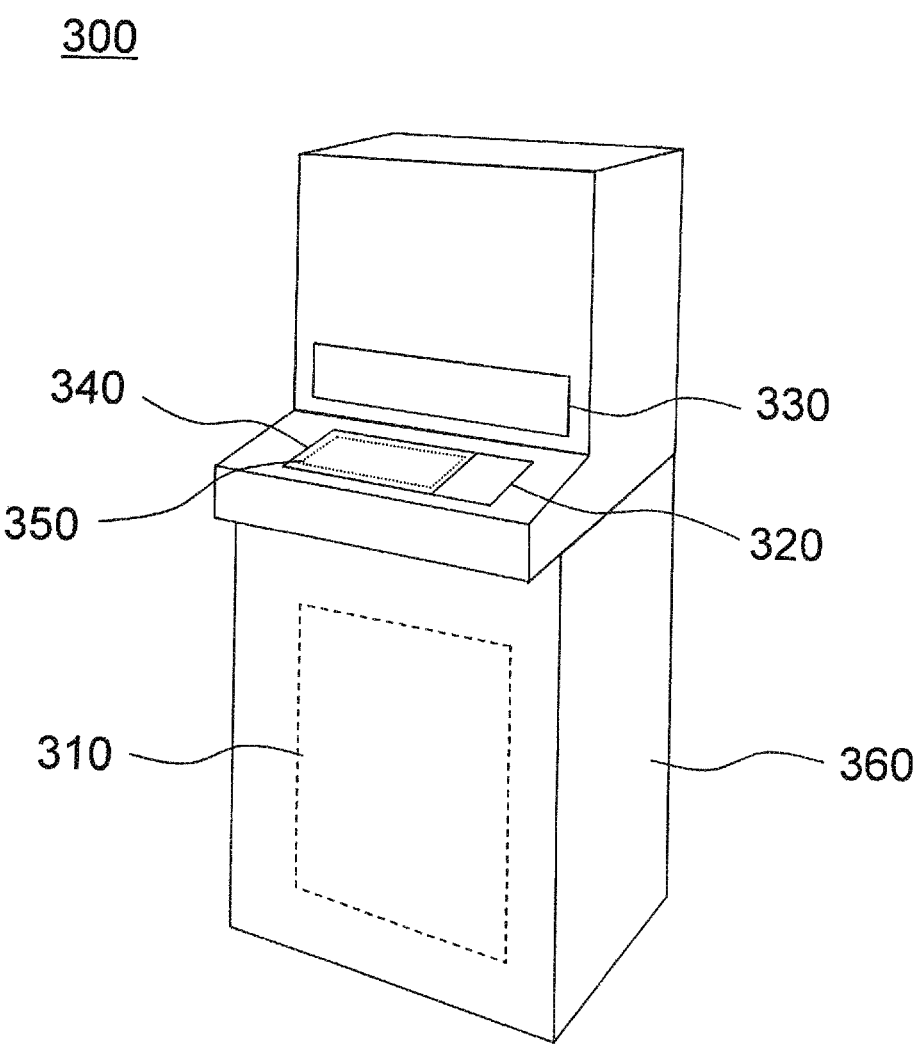
FIG. 4 is a schematic view showing a hardware configuration of a provision device usable for the provision system in an embodiment according to the present invention.

FIG. 4 is a schematic view showing a hardware configuration of the provision device usable for the provision system in an embodiment according to the present invention. As shown in FIG. 4, the provision device 300 includes a storage unit 310, a device communication unit 320, a provision unit 330, a device display unit 340, a device operation unit 350, and a housing 360.

The storage unit 310 stores cash such as banknotes, coins or the like as a provision item to be provided by the provision device 300. The cash stored on the storage unit 310 is supplemented by, for example, an operator outside the operation hours of the provision system 10. The storage unit 310 may have a function of managing the balance of the cash stored thereon and notifying when the balance becomes less than a certain amount.

The device communication unit 320 communicates with a communication terminal 200 that requested a cash transaction. The device communication unit 320 includes a near field communication unit as a communication unit. The "near field communication" is a communication protocol using a high frequency radio wave from megahertz to gigahertz and allowing a communication to be performed in a range of several meters to several ten meters. The near field communication is a communication protocol by which a radio wave released from a radio wave source is received and any of various types of information such as inherent information of a communication device, a distance between the radio wave source and the communication device, and the like is transmitted.

Examples of the near field communication include RFID (Radio Frequency Identifier) and BLE (Bluetooth™ Low Energy). In the case where RFID is used as the near field communication, an RFID device is included in the communication terminal 200. In the case where BLE is used as the near field communication, a BLE device is included in the provision device 300. Examples of the RFID include HF-band RFID using a radio wave in the 13.56 MHz band and UHF-band RFID using a radio wave in the 900 MHz band. An example of the BLE device is a beacon that transmits device identification information on the provision device 300 using the Bluetooth. In the case where it is determined whether or not to permit a transaction based on whether or not the user is authenticated using the device identification information, the device identification information may be referred to as "authentication information".

In the case of performing a communication by use of BLE, the device communication unit 320 includes a radio wave source releasing a radio wave usable for the near field communication described above. In the case of communicating with the RFID device in the communication terminal 200, the device communication unit 320 may include a radio wave source releasing a radio wave usable for a communication with the RFID device, a receiving unit receiving a radio wave modified by the RFID device in the communication terminal 200, and an analysis unit analyzing inherent information of the communication terminal 200 based on the modified radio wave. In the case where the provision device 300 includes a BLE device, the communication terminal 200 does not need to include an RFID device. By contrast, in the case where the communication terminal 200 includes an RFID device, the provision device 300 does not need to include a BLE device. It should be noted that the provision device 300 and the communication terminal 200 may respectively include the BLE device and the RFID device.

The provision unit 330 receives a provision command from the provision server 100 (command to execute the transaction) based on transaction information transmitted from the communication terminal 200 and a communication result including authentication information input to the communication terminal 200 before the above-described communication, and provides the user operating the communication terminal 200 with the cash stored on the storage unit 310. The "communication result" is information representing the communication between the communication terminal 200 and the provision device 300 (device communication unit 320). In other words, the communication result is information verifying that the communication terminal 200 and the provision device 300 communicated with each other, and is information indicating that the communication terminal 200 is present within a predetermined distance from the provision device 300. The "authentication information" is information indicating that the communication terminal 200 that communicated with the provision device 300 matches the communication terminal 200 that requested the transaction. Alternatively, the "authentication information" may be information indicating that the user operating the communication terminal 200 that communicated with the provision device 300 matches the user operating the communication terminal 200 that requested the transaction. The provision unit 330 has a sensing function of sensing the type of the banknote or the coin and the number thereof. The provision device 300 is a dispense-only device, and therefore, the provision unit 330 does not have a genuine/fake determination function of determining authenticity the banknote or the coin.

The device display unit 340 displays the content of the transaction performed by the operation made on the communication terminal 200, an operation guidance to the user, the state of the communication between the communication terminal 200 and the provision device 300, and the communication result thereof. The device display unit 340 includes an image display mechanism such as a liquid crystal display device, an organic EL display device or the like and has a function of displaying an image. In the case where there is no need to display an image, the device display unit 340 may include a light source of point light emission such as an LED lamp, a halogen lamp or the like. In the case where there is no need to display information for the user, the device display unit 340 may be omitted.

The device operation unit 350 accepts an operation such as an input, a selection or the like made by the user of the communication terminal 200. The device operation unit 350 includes a press-button type or touch panel type operation mechanism and has an operation function. In the case where there is no need for the user to operate the provision device 300, the device operation unit 350 may be omitted.

The housing 360 houses the storage unit 310, the device communication unit 320, the provision unit 330, the device display unit 340 and the device operation unit 350, and protects these elements against an external impact and prevents these elements from being detached from the provision device 300.

[Hardware Configuration of the Communication Terminal 200]

Figure 5:
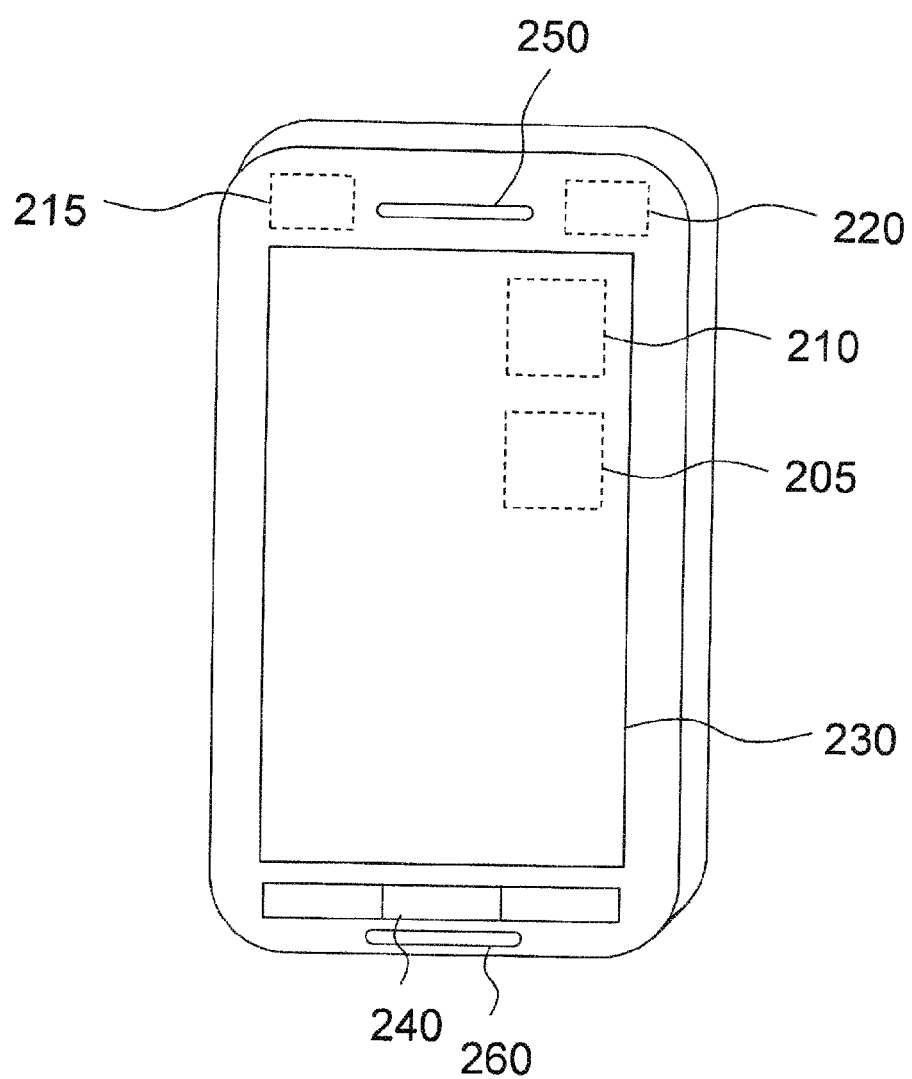
FIG. 5 is a schematic view showing a hardware configuration of a communication terminal usable for the provision system in an embodiment according to the present invention.

FIG. 5 is a schematic view showing a hardware configuration of the communication terminal usable for the provision system in an embodiment according to the present invention. As shown in FIG. 5, the communication terminal 200 includes a terminal storage unit 205, a terminal control unit 210, a first terminal communication unit 215, a second terminal communication unit 220, a display 230, operation buttons 240, a speaker 250, and a microphone 260.

The terminal storage unit 205 stores data such as a program for allowing the communication terminal 200 to execute a specific function, terminal identification information on the communication terminal 200, personal information on the user owned by the communication terminal 200 or the like. The terminal storage unit 205 includes a nonvolatile memory such as a flash memory or the like and a volatile memory such as an SRAM, a DRAM or the like. The terminal storage unit 205 may include a hard disc in addition to the nonvolatile memory and the volatile memory or instead of the nonvolatile memory. The data such as the program or the like is temporarily stored on the volatile memory, and the data such as the terminal identification information, the personal information on the user or the like is stored on the nonvolatile memory or the hard disc. In the case where it is determined whether or not permit a transaction based on whether or not the user is authenticated using the terminal identification information, the terminal identification information may be referred to as "authentication information".

The terminal control unit 210 includes a computation circuit such as a CPU or the like, and a storage circuit such as a memory, a register or the like. The terminal control unit 210 executes, by the CPU, the program stored on the terminal storage unit 205, and realizes various functions of the communication terminal 200 in response to a command signal input by the communication terminal 200.

The first terminal communication unit 215 communicates with the provision device 300. The first terminal communication unit 215 includes a near field communication unit, like the device communication unit 320. In this example, the first terminal communication unit 215 includes an RFID device. In this case, the first terminal communication unit 215 includes an antenna receiving a radio wave released from the radio wave source and a logic circuit analyzing the received radio wave. The first terminal communication unit 215 may include a logic circuit modulating the radio wave released from the radio wave source in order to transmit the terminal identification information on the communication terminal 200.

The second terminal communication unit 220 includes an antenna transmitting and receiving a signal wirelessly, a high frequency circuit, a demodulation circuit and the like. The second terminal communication unit 220 is controlled by the terminal control unit 210 to be connected with the network 500 and to access the provision server 100.

The display 230 may be a liquid crystal display device, an organic EL display device or the like. The display 230 may include a touch sensor. The touch sensor may be a sensor of a resistance film type, an electrostatic capacitance type, an optical type or the like. The user follows the information displayed on the display device to operate the communication terminal 200 and thus realizes any of various functions such as a transaction of a provision item or the like.

In the example shown in FIG. 5, the communication terminal 200 includes the operation buttons 240, the speaker 250 and the microphone 260. The communication terminal 200 is not limited to having such a configuration. According to the present invention, the operation buttons 240, the speaker 250 and the microphone 260 may be omitted if not needed for an operation for a transaction.

In FIG. 5, a smartphone is shown as an example of the communication terminal. The communication terminal 200 usable for the provision system 10 is not limited to a smartphone. The communication terminal 200 usable for the provision system 10 merely needs to have a communication function. a display function and an operation function. Instead of the smartphone, a mobile phone, a tablet computer, a PC, a PDA, a notebook computer, a PHS or the like is usable.

[Functional Structure of the Provision Server 100]

Figure 6:
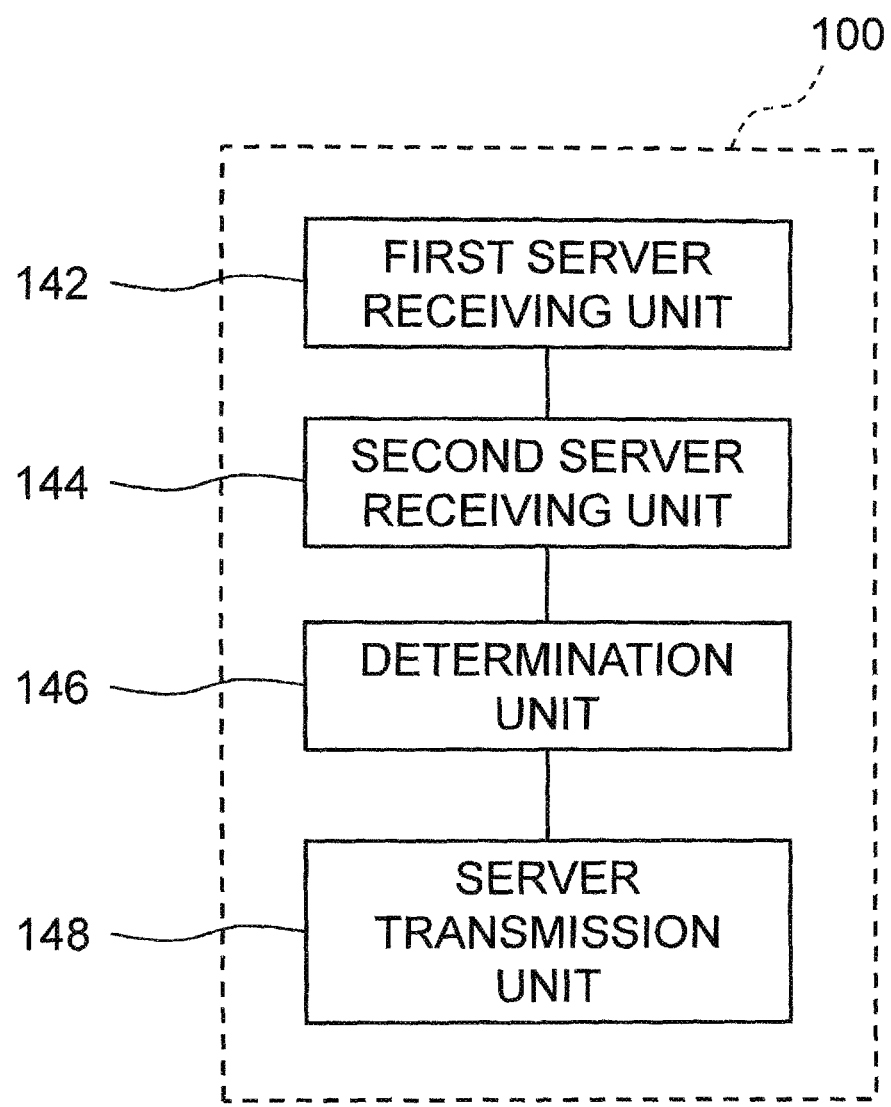
FIG. 6 is a block diagram showing a functional structure of the server usable for the provision system in an embodiment according to the present invention.

FIG. 6 is a block diagram showing a functional structure of the server usable for the provision system in an embodiment according to the present invention. As shown in FIG. 6, the provision server 100 includes a first server receiving unit 142, a second server receiving unit 144, a determination unit 146, and a server transmission unit 148.

The first server receiving unit 142 receives transaction information transmitted by the communication terminal 200 that requests the provision device 300, storing cash (provision item), to perform a cash transaction. The "transaction information" is information on a transaction concluded by the communication terminal 200 in advance, and includes the amount of the cash to be withdrawn from the provision device 300, information on the account that is the target of transaction (name of the financial institution, name of the branch, account number, name of the account holder, etc.) and user authentication information on the user operating the communication terminal 200 (user ID, password, etc.). The expression "the transaction is concluded" refers to a state where the transaction has been performed by the communication terminal 200 and a reservation of the transaction is confirmed, which corresponds the steps after step S504 shown in, for example, FIG. 9.

The second server receiving unit 144 receives a communication result generated by a communication between the communication terminal 200 and the provision device 300. In the case where the communication is made by use of the BLE device included in the device communication unit 320, the communication result is transmitted from the communication terminal 200 to the second server receiving unit 144. In this case, the communication result includes device identification information on the provision device 300 transmitted from the provision device 300 to the communication terminal 200 by the BLE device. In the case where the communication is made by use of the RFID device included in the first terminal communication unit 215, the communication result is transmitted from the provision device 300 to the second server receiving unit 144. In this case, the communication result includes the terminal identification information on the communication terminal 200 transmitted from the communication terminal to the provision device 300 by the RFID device.

The determination unit 146 determines whether or not to permit the transaction based on the transaction information and the communication result. Namely, the determination unit 146 determines whether or not to carry out the provision of the cash in accordance with the content of the transaction transmitted from the communication terminal 200. In the case where the communication is made by use of the BLE device as described above, the determination on whether or not permit the transaction is made by comparing the communication terminal 200 that transmitted the transaction information received by the first server receiving unit 142 and the communication terminal 200 that transmitted the communication result, including the device identification information, received by the second server receiving unit 144 against each other. In the case where the communication is made by use of the RFID device as described above, the determination on whether or not permit the transaction is made by comparing the communication terminal 200 that transmitted the transaction information received by the first server receiving unit 142 and the terminal identification information on the communication terminal 200 included in the communication result received by the second server receiving unit 144 against each other.

The server transmission unit 148 transmits, to the provision device 300, a command to provide the user of the communication terminal 200 with the cash based on the transaction information and the communication result. Namely, in the case where the determination unit 146 determines to permit the transaction, the server transmission unit 148 transmits, to the provision device 300, a command to provide the user of the communication terminal 200 with the cash based on the transaction information.

[Functional Structure of the Provision Device 300]

Figure 7:
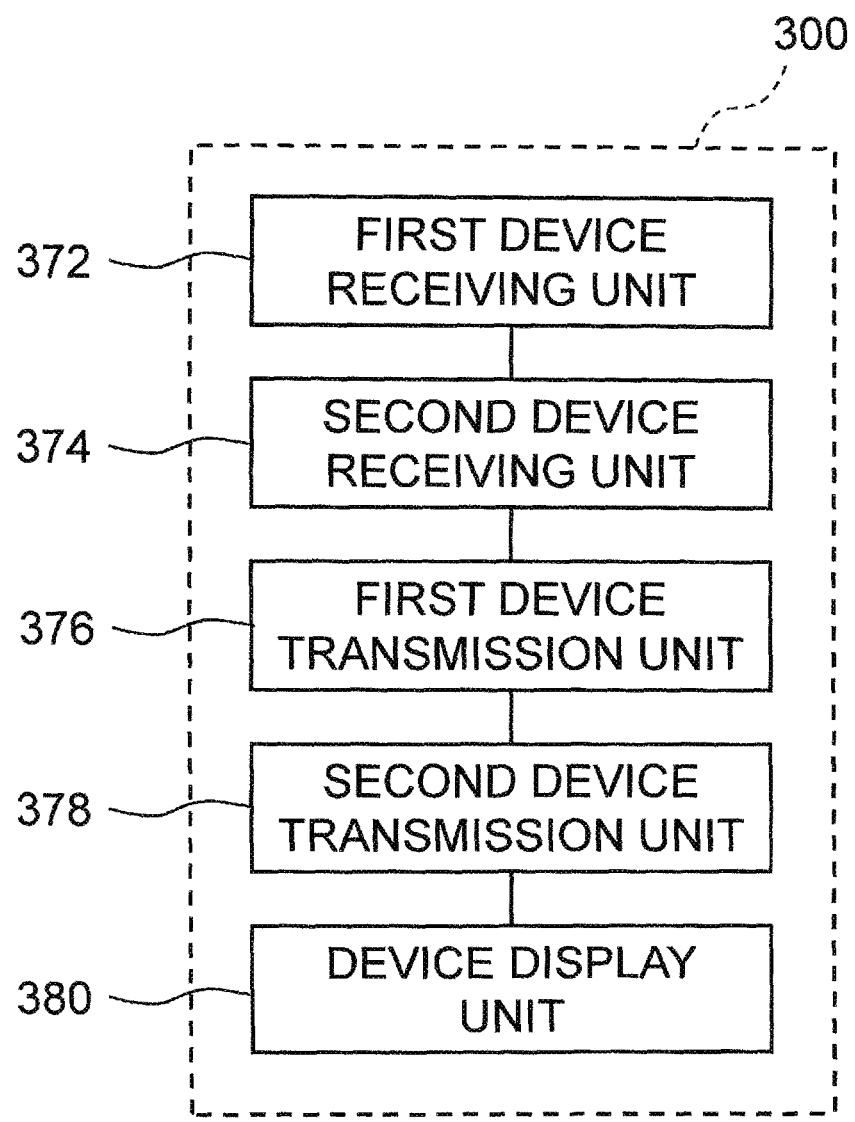
FIG. 7 is a block diagram showing a functional structure of the provision device usable for the provision system in an embodiment according to the present invention.

FIG. 7 is a block diagram showing a functional structure of the provision device usable for the provision system in an embodiment according to the present invention. As shown in FIG. 7, the provision device 300 includes a first device receiving unit 372, a second device receiving unit 374, a first device transmission unit 376, a second device transmission unit 378, and a device display unit 380. The first device receiving unit 372, the second device receiving unit 374, the first device transmission unit 376 and the second device transmission unit 378 are functions of the device communication unit 320 shown in FIG. 4.

The first device receiving unit 372 receives the terminal identification information from the communication terminal 200 by a communication between the communication terminal 200 and the provision device 300. The first device transmission unit 376 transmits, to the provision server 100, a communication result including the terminal identification information received from the communication terminal 200. The second device receiving unit 374 receives a command to provide the cash, the command being transmitted from the provision server 100 to the communication terminal 200 based on the transaction information and the communication result. The device display unit 380 provides an interface visually providing the user with the content of the transaction performed by the operation made on the communication terminal 200, an operation guidance to the user, the state of the communication between the communication terminal 200 and the provision device 300, and the communication result thereof. The second device transmission unit 378 transmits, to the communication terminal 200, the device identification information on the provision device 300 by the communication between a communication terminal 200 and the provision device 300.

In the case where the communication is made by use of the BLE device included in the provision device 300, the first device receiving unit 372 may be omitted. In the case where the communication is made by use of the RFID device included in the communication terminal 200, the second device transmission unit 378 may be omitted.

[Functional Structure of the Communication Terminal 200]

Figure 8:
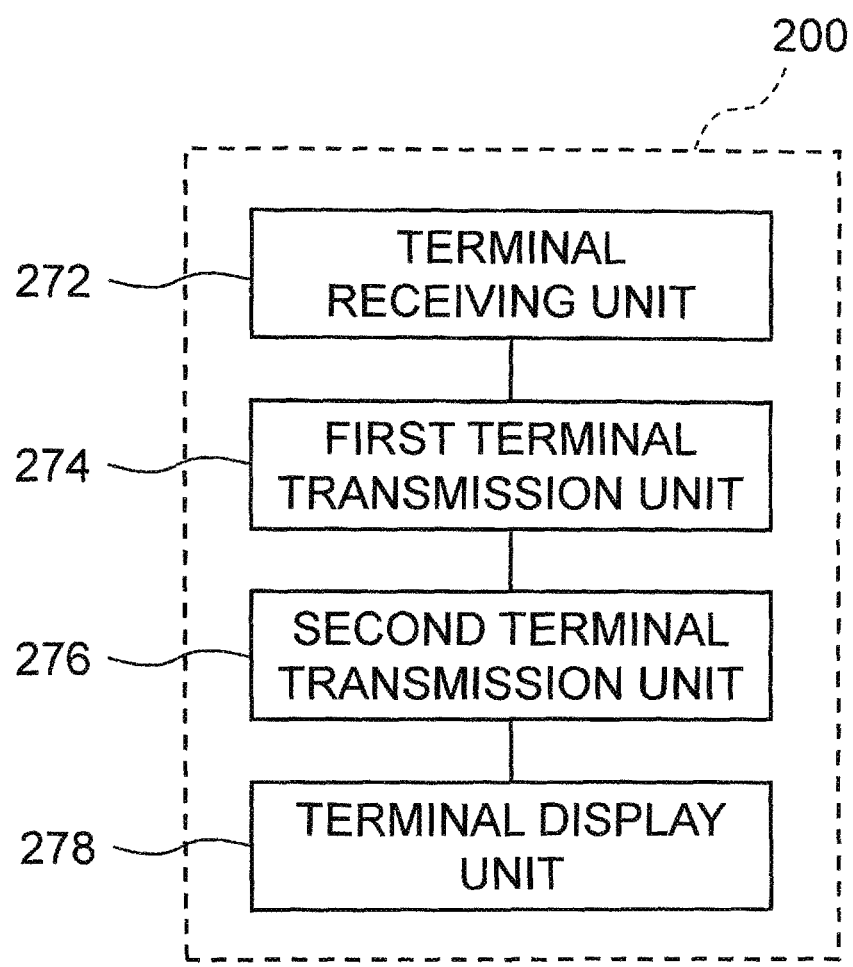
FIG. 8 is a block diagram showing a functional structure of the communication terminal usable for the provision system in an embodiment according to the present invention.

FIG. 8 is a block diagram showing a functional structure of the communication terminal usable for the provision system in an embodiment according to the present invention. As shown in FIG. 8, the communication terminal 200 includes a terminal receiving unit 272, a first terminal transmission unit 274, a second terminal transmission unit 276, and a terminal display unit 278.

The first terminal transmission unit 274 transmits the terminal identification information on the communication terminal 200 to the provision device 300 by a communication between the communication terminal 200 and the provision device 300. The second terminal transmission unit 276 transmits the transaction information and the communication result to the provision server 100. The terminal display unit 278 provides an interface visually providing the user with an operation guidance to the user for the transaction, the state of the communication between the communication terminal 200 and the provision device 300, and the communication result thereof. The terminal receiving unit 272 receives the device identification information from the provision device 300 by a communication between the communication terminal 200 and the provision device 300.

In the case where the communication is made by the BLE device included in the provision device 300, the first terminal transmission unit 274 may be omitted. In the case where the communication is made by the RFID device included in the communication terminal 200, the terminal receiving unit 272 may be omitted.

[Operation Flow of the Provision System 10]

Figure 9:
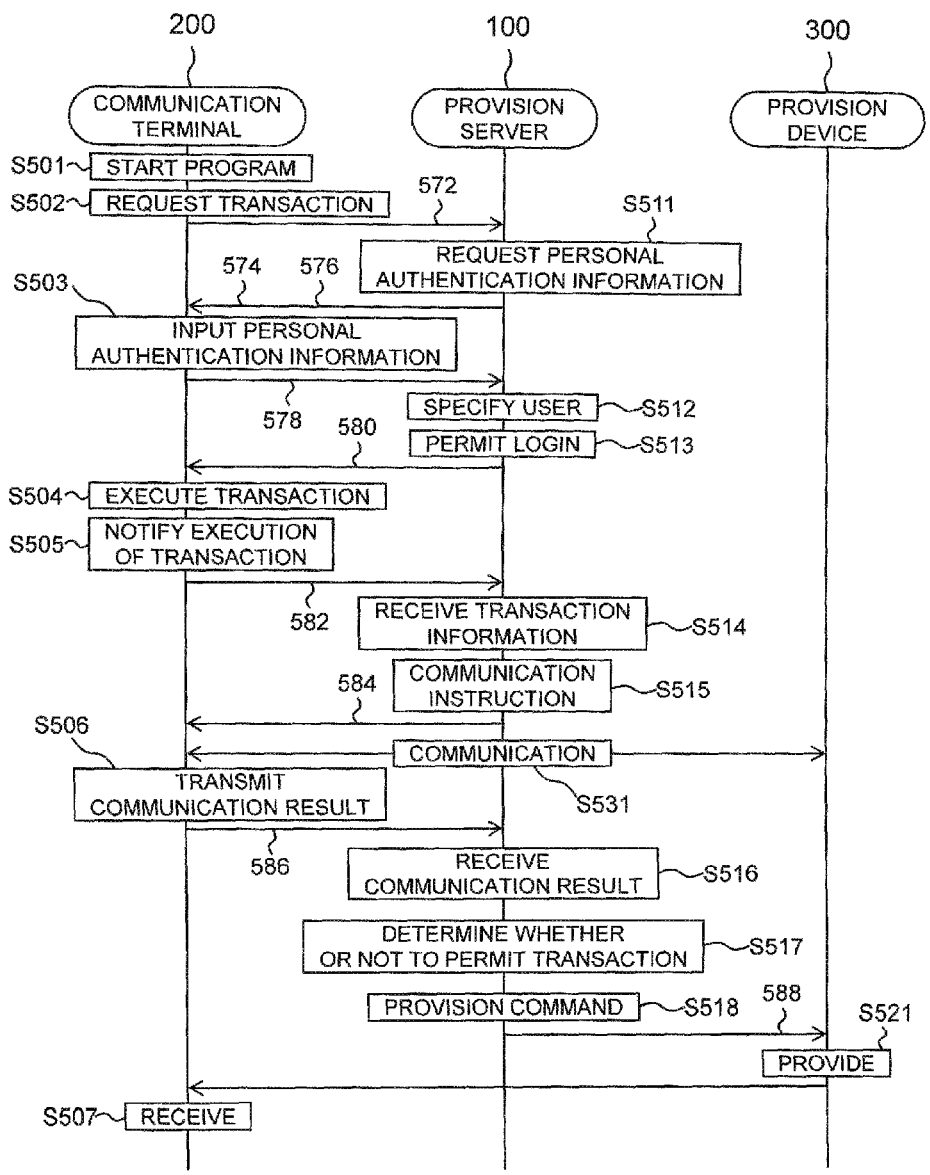
FIG. 9 is a flowchart showing an operation of the provision system in an embodiment according to the present invention.

FIG. 9 is a flowchart showing an operation of the provision system in an embodiment according to the present invention. With reference to the flowchart in FIG. 9, the operation of each block of the provision system 10 shown in FIG. 2 will be described in detail. In the flowchart referred to below, the case where the communication between the communication terminal 200 and the provision device 300 is performed by use of the BLE device included in the provision device 300 will be described.

First, the communication terminal 200 starts a program for operating the provision system 10 (step S501). Next, the communication terminal 200 makes a transaction request that cash should be withdrawn from the provision device 300 (step S502). In step S502, the communication terminal 200 transmits a transaction request signal 572 to the provision server 100.

Upon receipt of the transaction request signal 752, the provision server 100 makes a personal authentication information request that requests information that is necessary for the communication terminal 200 to log in to a transaction system in order to execute the transaction (step S511). In step S511, the provision server 100 transmits a personal authentication information request signal 574 and a login interface provision signal 576 to the communication terminal 200.

Upon receipt of the personal authentication information request signal 574 and the login interface provision signal 576 by the communication terminal 200, the display 230 of the communication terminal 200 displays an interface usable to log in to the transaction system. The user operates the communication terminal 200 in response to the interface, and thus the personal authentication information is input (step S503). As the personal authentication information, a user ID and a password are input. In step S503, the communication terminal 200 transmits personal authentication information 578 to the provision server 100.

Upon receipt of the personal authentication information 578, the provision server 100 specifies the user based on the personal authentication information 578 (step S512). Upon the user being specified in step S512, the communication terminal 200 is permitted to log in to the transaction system (step S513). In step S513, the provision server 100 transmits a login success notification 580 to the communication terminal 200.

Upon receipt of the login success notification 580, the communication terminal 200 may log in to the transaction system to select and execute any of various transactions. In this example, cash withdrawal is executed as the transaction. Upon execution of a transaction procedure desired by the user (step S504), the communication terminal 200 notifies execution of the transaction (step S505). In step S505, the communication terminal 200 transmits, to the provision server 100, transaction information 582 including the content of the transaction selected and executed by the user.

Upon receipt of the transaction information 582 (step S514), the provision server 100 instructs the communication terminal 200 to make a communication with the provision device 300 (step S515). In step S515, the provision server 100 transmits communication instruction information 584 to the communication terminal 200. At this point, the provision server 100 may designate the provision device 300 with which the communication is to be made, based on positional information on the communication terminal 200. The designation of the provision device 300 may be made for the device itself, the branch in which the provision device 300 is installed, or the area in which the provision device 300 is present. In this case, the communication instruction information 584 may include information on the designated provision device 300, information on the designated branch or information on the designated area.

Upon receipt of the communication instruction information 584 by the communication terminal 200, the display 230 of the communication terminal 200 displays an instruction to make a communication with the provision device 300. When the user puts the communication terminal 200 close to the provision device 300, the communication is made between the communication terminal 200 and the provision device 300 (step S531). In step S531, the communication terminal 200 generates a communication result including device identification information on the provision device 300. Then, the communication terminal 200 transmits the communication result (step S506). In step S506, the communication terminal 200 transmits a communication result 586 to the provision server 100.

Upon receipt of the communication result 586 (step S516), the provision server 100 determines whether or not to permit the transaction based on the transaction information 582 and the communication result 586 (step S517). In the case where the transaction is permitted, the provision server 100 issues a command to withdraw the cash (provision command or transaction execution command) based on the transaction information 582 (step S518). In step S518, the provision server 100 transmits a provision command 588 to the provision device 300. The provision command 588 includes the content of the provision (amount of the cash to be withdrawn) based on the transaction information 582.

Upon receipt of the provision command 588, the provision device 300 provides the cash of the amount instructed by the provision command 588 (step S521). Thus, the user of the communication terminal 200 withdraws (receives) the cash (step S507).

In the flowchart shown in FIG. 9, the communication is made by use of the BLE device included in the provision device 300. Therefore, the communication result of the communication in step S531 is transmitted from the communication terminal 200 to the provision server 100 (step S506). The present invention is not limited to such a flow. In the case where the communication is made by use of the RFID device included in the communication terminal 200, a communication result including terminal identification information on the communication terminal 200 may be generated by the provision device 300 as a result of the communication in step S531, and the communication result may be transmitted from the provision device 300 to the provision server 100.

[Communication Method Between the Communication Terminal 200 and the Provision Device 300]

Figure 10:
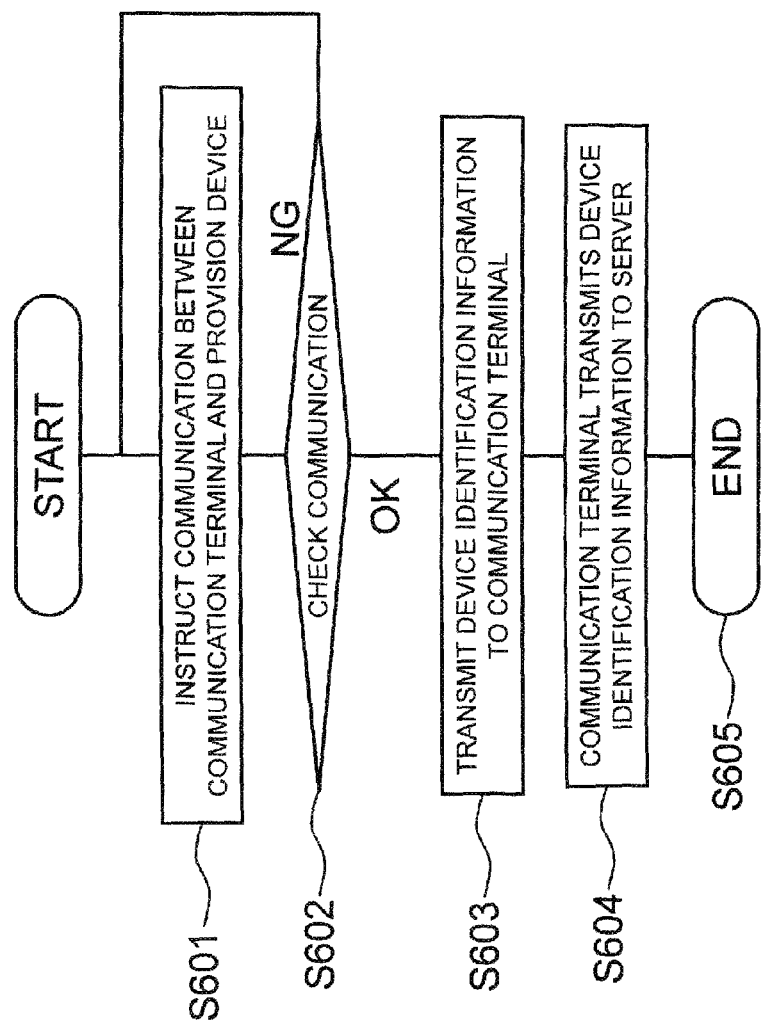
FIG. 10 is a flowchart showing a communication method between the provision device and the communication terminal in the provision system in an embodiment according to the present invention.

FIG. 10 is a flowchart showing a communication method between the provision device and the communication terminal in the provision system in an embodiment according to the present invention. The flowchart shown in FIG. 10 shows a communication method from the communication instruction in step S515 to the transmission of the communication result in step S506 in FIG. 9. In the flowchart referred to below, the case where the communication between the communication terminal 200 and the provision device 300 is performed by use of the BLE device included in the provision device 300 will be described.

When instructed by the provision server 100 to cause a communication between the communication terminal 200 and the provision device 300 (step S601), the user puts the communication terminal 200 close to the provision device 300 in an attempt to cause a communication. In the case where the communication is made successfully ("OK" in step S602), the device identification information on the provision device 300 is transmitted to the communication terminal 200 (step S603). The communication terminal 200 generates a communication result including the device identification information, and transmits the communication result to the provision server 100 (step S604). By contrast, In the case where the communication results in a failure in step S602 ("NG" in step S602), the communication instruction is issued again in step S601. It is checked whether the communication is made successfully or not in step S602 at a certain time interval.

Figure 11:
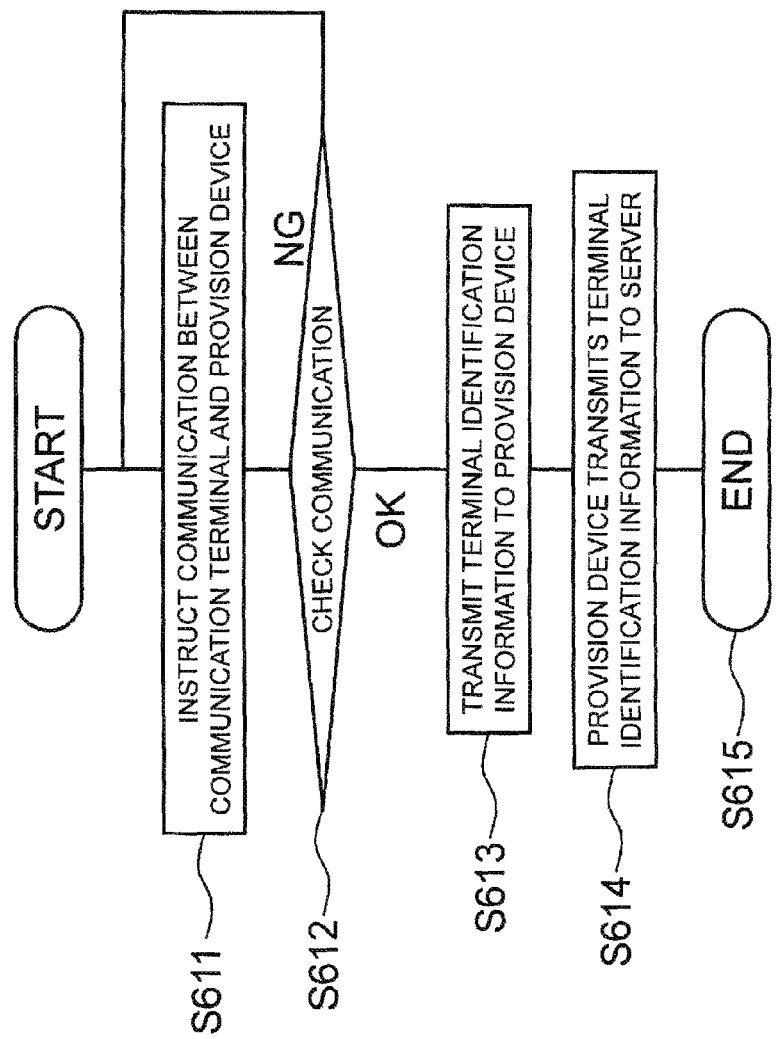
FIG. 11 is a flowchart showing a communication method between the provision device and the communication terminal in the provision system in an embodiment according to the present invention.

The flowchart in FIG. 10 shows the case where the communication is made by use of the BLE device included in the provision device 300. In the case where the communication is made by use of the RFID device included in the communication terminal, the flowchart shown in FIG. 11 is used. In FIG. 11, step S611 and step S612 are substantially the same as step S601 and step S602 in FIG. 10. Referring to FIG. 11, in the case where the communication is made successfully ("OK" in step S612), the terminal identification information on the communication terminal 200 is transmitted to the provision device 300 (step S613). The provision device 300 generates a communication result including the terminal identification information, and transmits the communication result to the provision server 100 (step S614). In the case where the communication results in a failure, the operation is substantially the same as that in FIG. 10.

[Method by which the Provision Server 100 Determines Whether or not to Permit the Transaction]

Figure 12:
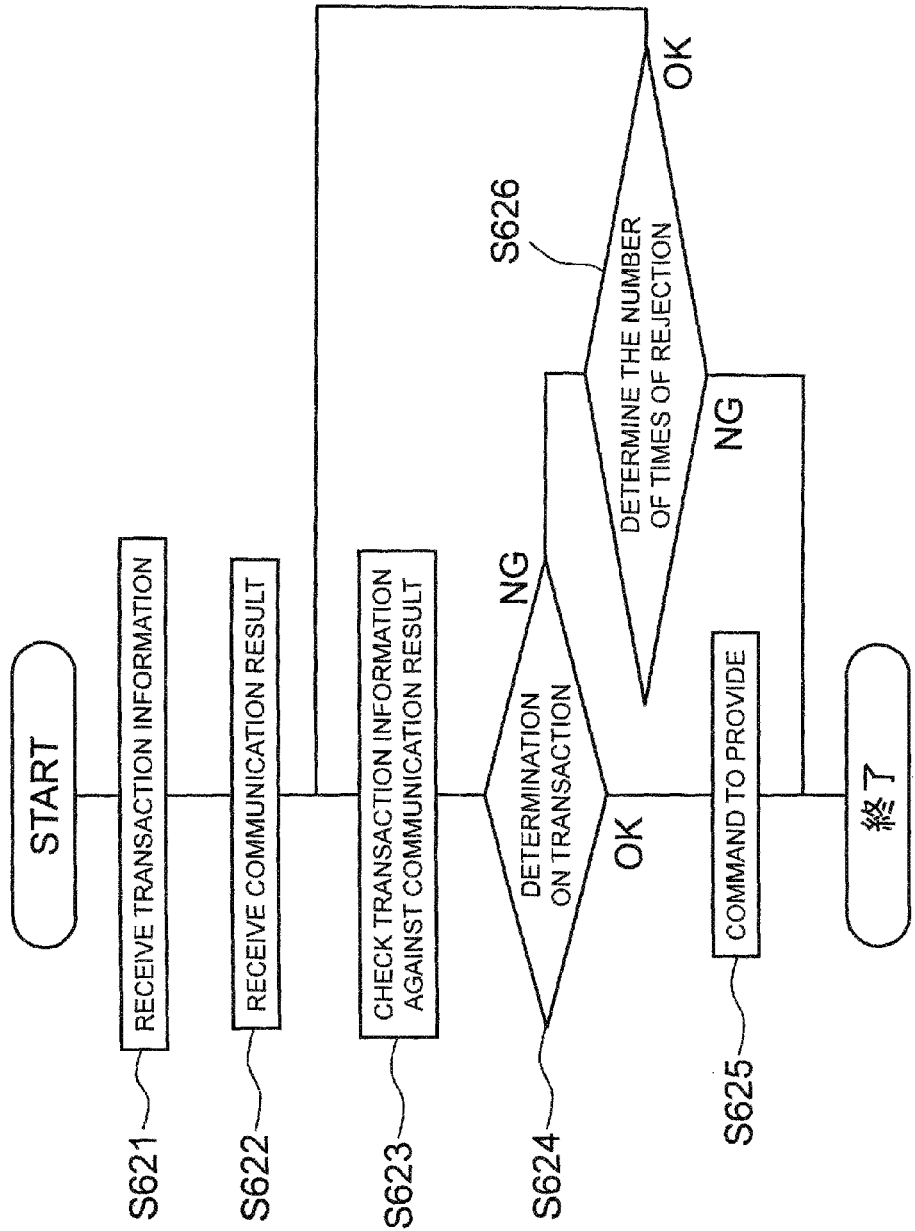
FIG. 12 is a flowchart showing a method by which the server in the provision system in an embodiment according to the present invention determines whether or not to permit a transaction.

FIG. 12 is a flowchart showing a method by which the server in the provision system in an embodiment according to the present invention determines whether or not to permit the transaction. The provision server 100 receives the transaction information (step S621). Upon receipt of the communication result (step S622), the provision server 100 checks the transaction information and the communication result against each other (step S623). In the case where the transaction is permitted as a result of the checking in step S623 ("OK" in step S624), the provision server 100 transmits, to the provision device 300, a provision command in accordance with the content of the transaction (step S625).

By contrast, in the case where the transaction is rejected as a result of the checking in step S623 ("NG" in step S624), the number of times the transaction was rejected is determined (step S626). In this example, in the case where the number of times the transaction was rejected is greater than, or equal to, a certain number of times ("NG" in step S626), the transaction is forcibly terminated. By contrast, in the case where the number of times the transaction was rejected is less than the certain number of times, the operation flow returns to step S623, and the transaction information and the communication result are checked against each other again.

As described above, with the provision system 10 in embodiment 1, the functional units of the provision server 100 allow the user to conclude the transaction by use of the communication terminal 200 before the user operates the provision device 300, and also allow the user to cause a direct communication between the communication terminal 200 and the provision device 300 to receive the cash. Therefore, the provision system 10 requires the user to make a smaller number of operations on the provision device 300. In addition, the provision device 300 is a dispense-only device and does not need to have a genuine/fake determination function, and thus costs low.

Embodiment 2

Figure 13:
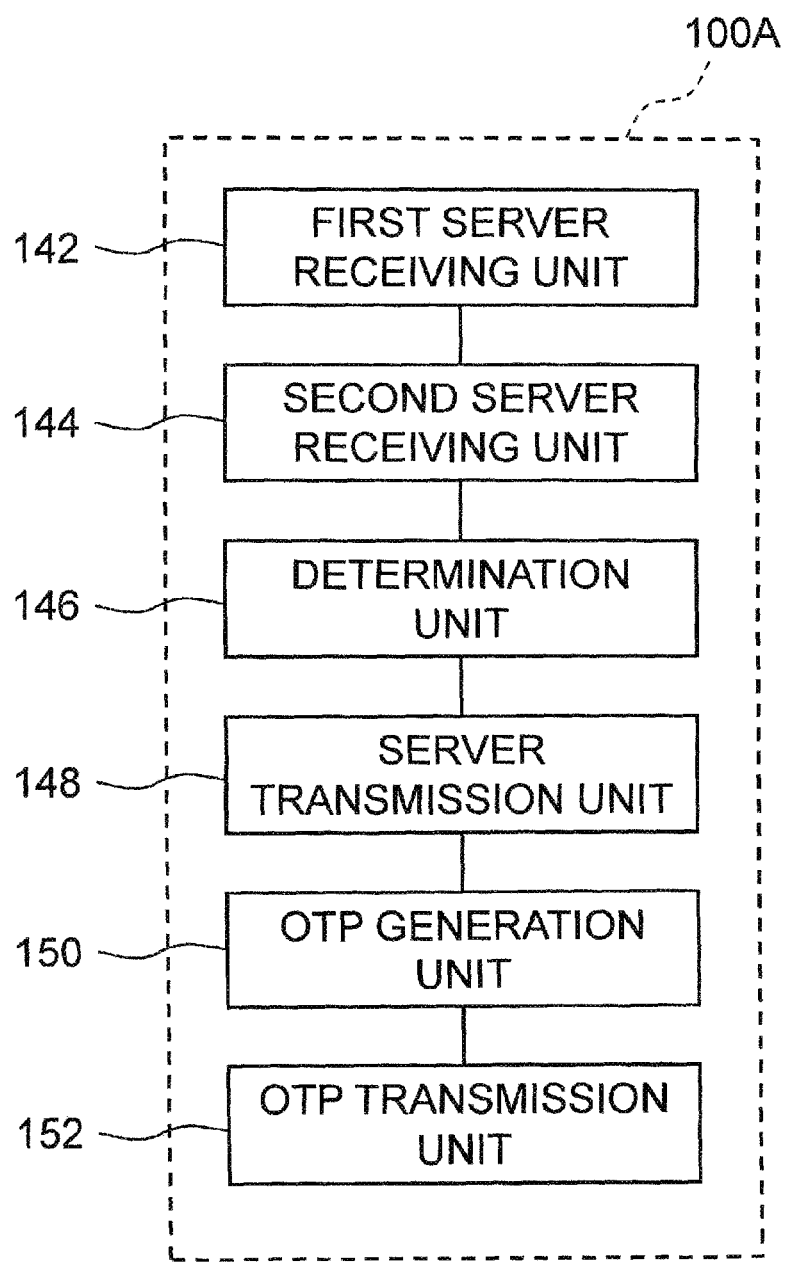
FIG. 13 is a block diagram showing a functional structure of a server usable for a provision system in an embodiment according to the present invention.
Figure 14:
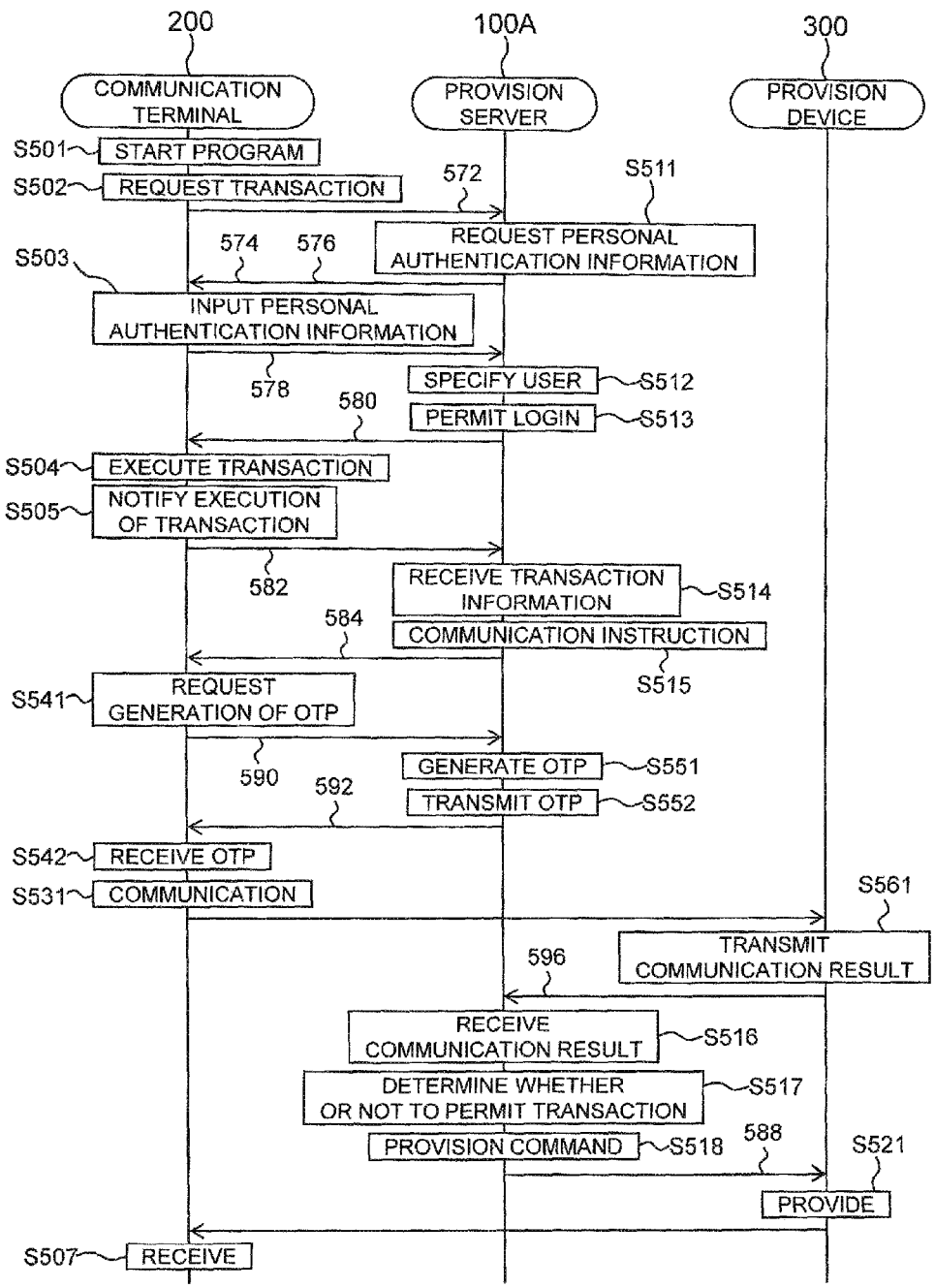
FIG. 14 is a flowchart showing an operation of the provision system in an embodiment according to the present invention.

With reference to FIG. 13 and FIG. 14, a provision system, and a server, a provision device and a communication terminal that are usable for the provision system, and also a program usable to operate the provision system, the server, the provision device and the communication terminal, all in embodiment 2 according to the present invention, will be described in detail. In embodiment 2, a provision device handling cash encompassing banknotes and coins as a provision item will be described. The provision device according to the present invention may be a device providing a user with a target item other than cash as a provision item. Examples of the provision item other than cash include tangible items such as a ticket, a coupon, a numbered ticket and the like, and intangible items such as a password, a procedure format, electronic money, an electronic ticket, client information and the like.

The overview of a provision system 20, the hardware configuration of the provision server, the hardware configuration of the provision device, and the hardware configuration of the communication terminal usable in embodiment 2 are substantially the same as those of the provision system 10 in embodiment 1 and will not be described here. The provision system 20 in embodiment 2 determines whether or not to permit a transaction by use of an OTP (One-Time Password herein after,) to improve the level of security of the transaction. A provision server 100A in embodiment 2 has a different functional structure from that of the provision server 100 in embodiment 1. Thus, the functional structure of the provision server 100A in embodiment 2 will be described here, and other descriptions will be omitted.

[Functional Structure of the Provision Server 100A]

FIG. 13 is a block diagram showing a functional structure of the server usable for the provision system in an embodiment according to the present invention. As shown in FIG. 13, the provision server 100A includes the first server receiving unit 142, the second server receiving unit 144, the determination unit 146 and the server transmission unit 148, and also includes an OTP generation unit 150 and an OTP transmission unit 152.

The OTP generation unit 150 generates an OTP in response to an OTP generation request made by the communication terminal 200. The "OTP" is a password different from a conventional fixed-type password. A certain time period is set for the permission of access provided by the OTP. The OTP may be a password, the access authorization provided by which is extinguished after an access is made once. Upon receipt of an OTP generation request, the OTP generation unit 150 generates a password selected from random numerical figures, letters, and symbols calculated with a time-dependent function or a password selected from random numerical figures, letters, and symbols.

The OTP transmission unit 152 transmits the OTP generated by the OTP generation unit 150 to the communication terminal 200. Upon receipt of the OTP transmitted by the OTP transmission unit 152 by the communication terminal 200, the OTP is stored on the terminal storage unit 205 of the communication terminal 200. The OTP transmission unit 152 may transmit the OTP as digitized data or encrypted data. In the case where the OTP is transmitted as encrypted data, the encrypted OTP and a key usable to decrypt the encrypted OTP may be transmitted separately.

The OTP stored on the communication terminal 200 is used later to determine whether or not to permit the transaction. A method for using the OTP to determine whether or not to permit the transaction will be described below in detail.

[Operation Flow of the Provision System 20]

FIG. 14 is a flowchart showing an operation of the provision system in an embodiment according to the present invention. The flowchart in FIG. 14 is similar to the flowchart in FIG. 9. In FIG. 14, the same operations as those in FIG. 9 bear the identical reference signs thereto. With reference to FIG. 14, the parts same as those of the operation flow in FIG. 9 will not be described, and the parts different from those of the operation flow in FIG. 9 will be described.

In FIG. 14, the login to the transaction system is made by substantially the same method as in the operation flow in FIG. 9. The operation flow in FIG. 14 is different from the operation flow in FIG. 9 in steps after the communication instruction (S515). Thus, in this example, the steps after the communication instruction (S515) of the operation flow will be described in detail.

Upon receipt, by the communication terminal 200, of the communication instruction information 584 transmitted in step S515, the display 230 of the communication terminal 200 displays an interface usable to request OTP generation. Upon execution of the OTP generation request (step S541), the communication terminal 200 transmits an OTP generation request signal 590 to the provision server 100A.

Upon receipt of the OTP generation request signal 590, the provision server 100A generates an OTP (step S551) and transmits OTP information 592 including the generated OTP to the communication terminal 200 (step S552). At this point, the OTP generated in step S551 is stored on the server storage unit 120 of the provision server 100A. Upon receipt of the OTP information 592 by the communication terminal 200, the OTP is stored on the terminal storage unit 205 of the communication terminal 200 (step S542).

The OTP received by the communication terminal 200 (step S542) is transmitted to the provision device 300 by a communication between the communication terminal 200 and the provision device 300 (step S531). The provision device 300 generates a communication result including the OTP, and transmits a communication result 596 including the OTP to the provision server 100A (step S561).

Upon receipt of the communication result 596 (S516), the provision server 100A determines whether or not to permit the transaction based on the transaction information 582 and the OTP included in the communication result 596 (step S517). Specifically, the OTP included in the communication result 596 and the OTP stored on the server storage unit 120 are compared against each other, and it is determined whether or not to permit the transaction.

As described above, the provision system 20 in embodiment 2 may use an OTP to determine whether or not to permit the transaction (S517). In this case, it is merely needed that the communication terminal 200 and the provision device 300 are communicable with each other so as to transmit and receive data, and do not need to have a function of transmitting the terminal identification information or the device identification information. It should be noted that the terminal identification information or the device identification information may be transmitted together with the OTP by the communication between the communication terminal 200 and the provision device 300.

[Features of the OTP Generated by the OTP Generation Unit 150]

Figure 15:
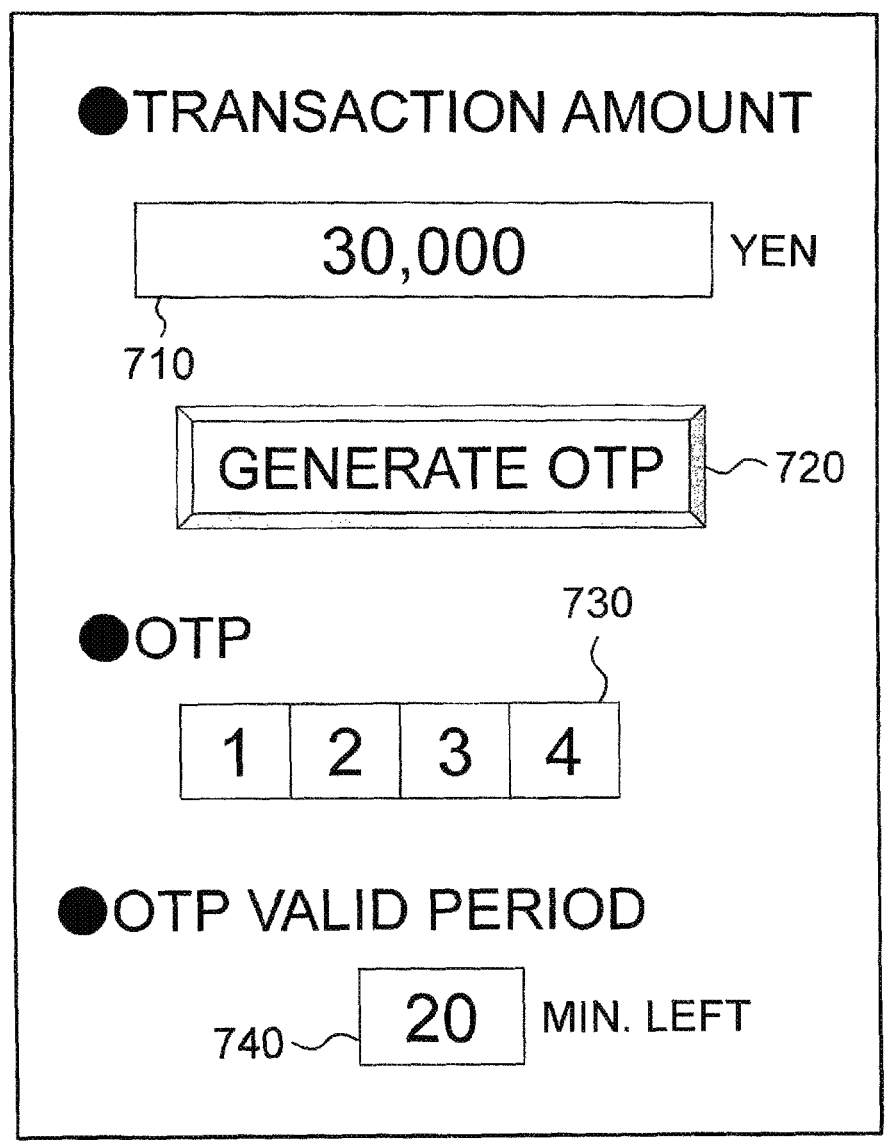
FIG. 15 shows an interface displaying an OTP provided by the server to a communication terminal in the provision system in an embodiment according to the present invention.

FIG. 15 shows an interface displaying an OTP provided by the server to the communication terminal in the provision system in an embodiment according to the present invention. As shown in FIG. 15, an interface 700 includes a transaction amount input box 710, an OTP generation request button 720, an OTP display area 730, and an OTP validity term display area 740. The interface 700 in FIG. 15 shows that "3,000 (yen)" is input to the transaction amount input box 710, the OTP generation request button 720 is pushed, and then "1234" is displayed as the OTP and "20 (min.)" is displayed as the validity term thereof.

The interface 700 in FIG. 15 shows an example in which the OTP generation unit 150 generates an OTP formed of four numerical figures. The OTP is not limited to this. Hereinafter, other examples of the OTP generated by the OTP generation unit 150 will be described with reference to FIG. 16 through FIG. 18.

Figure 16:
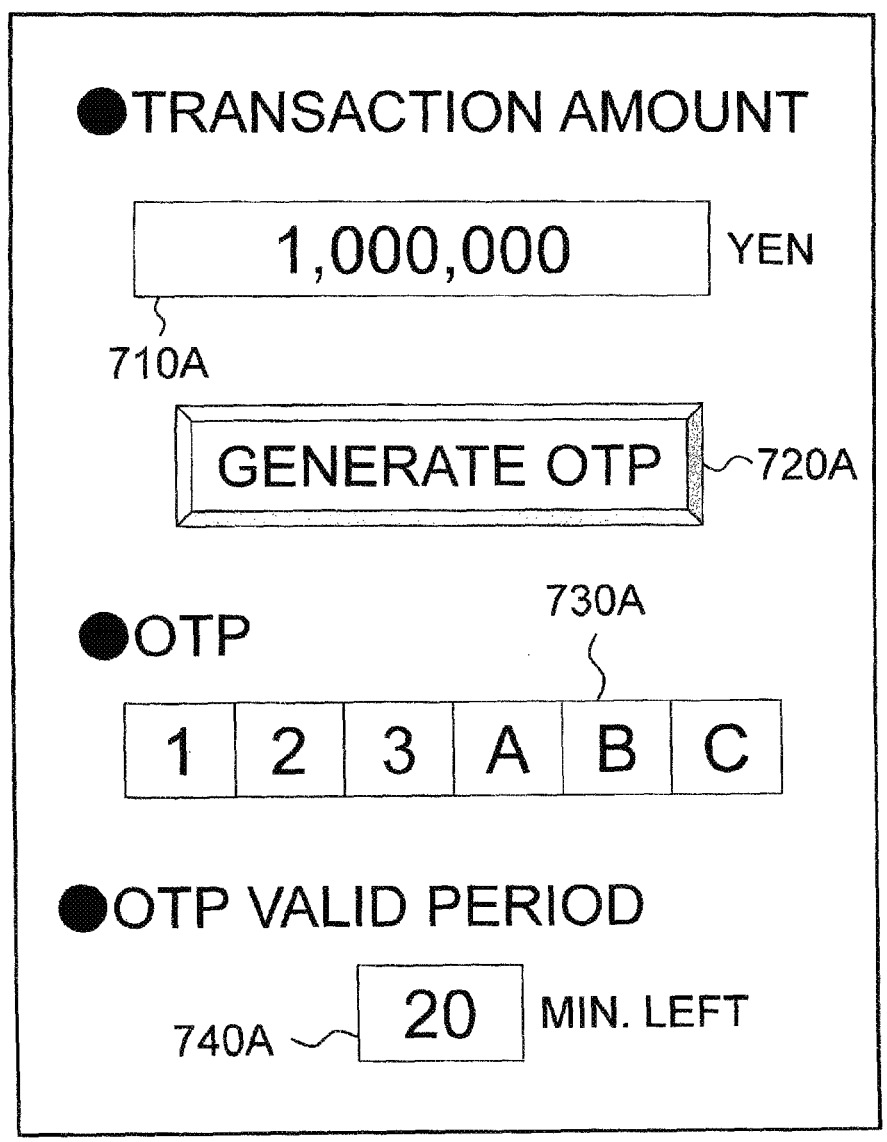
FIG. 16 shows an example of OTP generated by an OTP generation unit in the case where the transaction amount is larger than in FIG. 15.

FIG. 16 shows an example of OTP generated by the OTP generation unit in the case where the transaction amount is larger than that in FIG. 15. In an interface 700A shown in FIG. 16, "1,000,000 (yen)" is input to a transaction amount input box 710A. In an OTP display area 730A, numerical figures and letters in a total of six, "123ABC", are displayed. Namely, the OTP generation unit 150 may generate OTPs having different OTP lengths in accordance with the transaction information. Specifically, the OTP generation unit 150 may generate an OTP having a greater OTP length in the case where the transaction amount is larger. As described above, in the case where the transaction amount is larger, the OTP length is made greater, so that the level of security may be raised in accordance with the level of risk.

Figure 17:
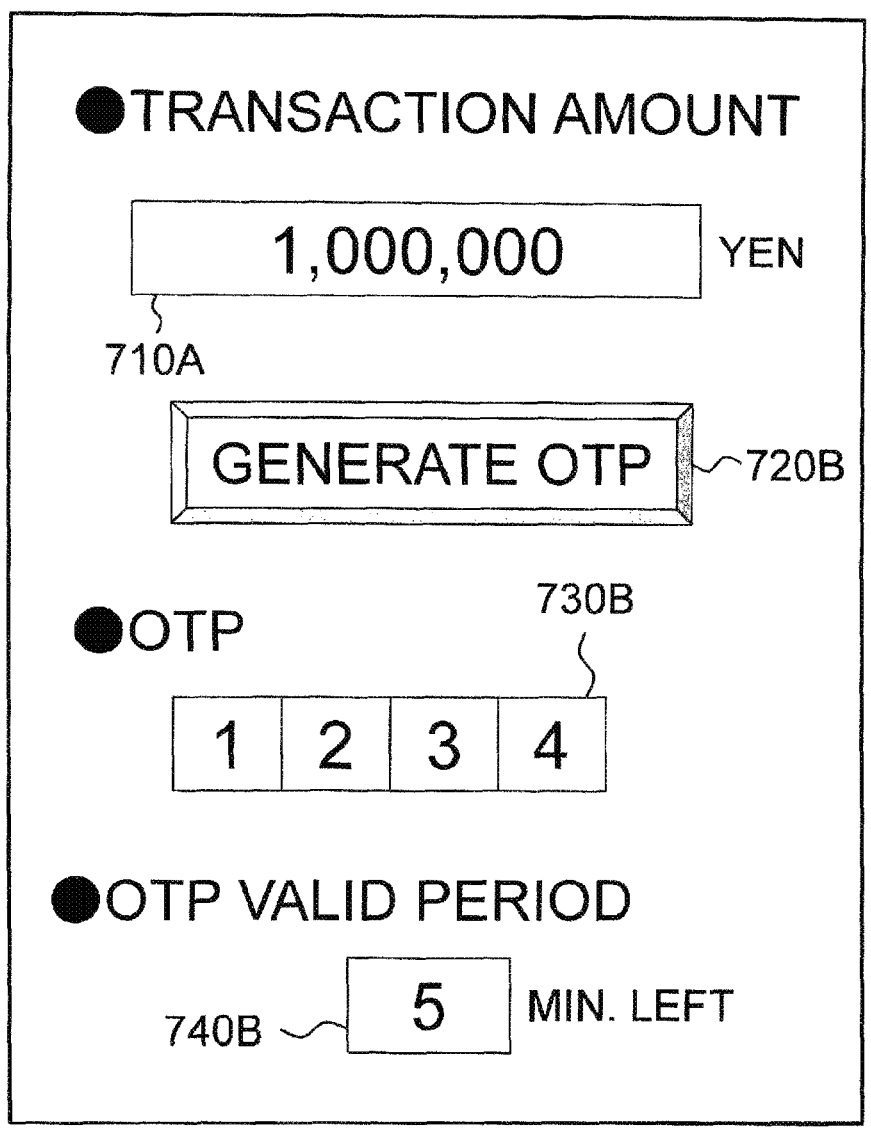
FIG. 17 shows an example of OTP generated by the OTP generation unit in the case where the transaction amount is larger than in FIG. 15.

FIG. 17 shows an example of OTP generated by the OTP generation unit in the case where the transaction amount is larger than that in FIG. 15. In an interface 700B shown in FIG. 17, "1,000,000 (yen)" is input to a transaction amount input box 710B. In an OTP display area 730B, four numerical figures "1234", are displayed, and in the OTP validity term display area 740, "5 (min.)" is displayed. Namely, the OTP generation unit 150 may generate OTPs having different OTP validity terms in accordance with the transaction information. Specifically, the OTP generation unit 150 may generate an OTP having a shorter OTP validity term in the case where the transaction amount is larger. As described above, in the case where the transaction amount is larger, the OTP validity term is made shorter, so that the level of security may be raised in accordance with the level of risk.

Figure 18:
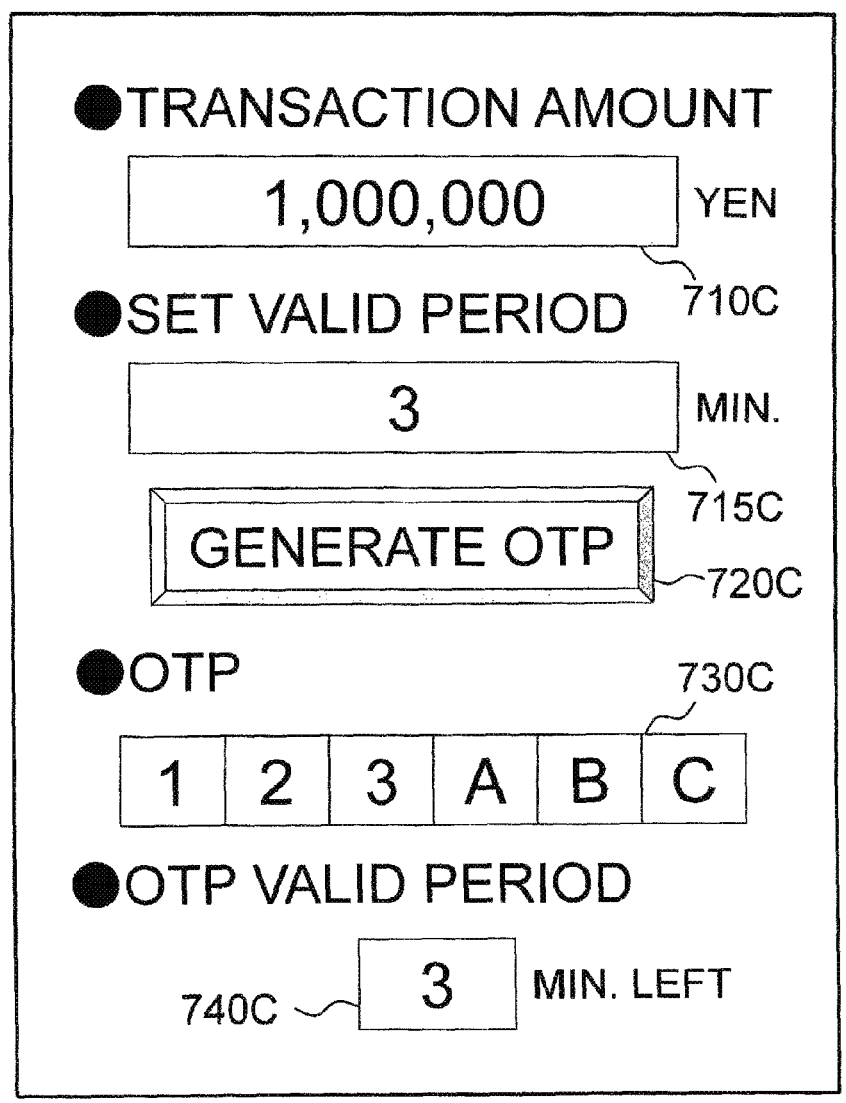
FIG. 18 shows an interface allowing a user to set an OTP validity term.

FIG. 18 shows an interface that allows the user to set the OTP validity term. An interface 700C shown in FIG. 18 includes a transaction amount input box 710C, an OTP generation request button 720C, an OTP display area 730C and an OTP validity term display area 740C, and also includes a validity term setting box 715C. The validity term setting box 715C accepts setting of an OTP validity term desired by the user. In the state where the transaction amount is input to the transaction amount input box 710C and the validity term is input to the validity term setting box 715C, the OTP generation request button 720C is selected. In this case, the validity term input to the validity term setting box 715C is set as the validity term and displayed in the OTP validity term display area 740C. Namely, the OTP generation unit 150 may generate an OTP having a validity term in accordance with the request made by the communication terminal 200. FIG. 18 shows an example of structure that allows the user to set the OTP validity term. A structure in which the OTP length may be set instead of the OTP validity term may be usable.

In the above-described example of embodiment 2, the provision server 100A includes the OTP generation unit 150 and the OTP transmission unit 152 as functional units thereof. The provision server is not limited to having such a structure. For example, the OTP generation unit 150 and the OTP transmission unit 152 may be provided in a device separate from the provision server 100A (e.g., OTP generation device). In this case, the OTP generation device and the provision server 100A may be connected with each other in a wired manner or in a wireless manner. The OTP generation device and the provision server 100A may be directly connected with each other, or may be connected with each other via a network.

As described above, the provision system 20 in embodiment 2 determines whether or not to permit the transaction by use of an OTP, and thus provides an effect substantially the same as that of embodiment 1 even without having a function of transmitting the terminal identification information or the device identification information.

An OTP having a different OTP length or OTP validity term is generated in accordance with the transaction information. Thus, for a transaction having a low risk, a simple OTP imposing a small load on the user is provided. For a transaction having a high risk, an OTP having a high level of security is provided. In this manner, an OTP suitable to the level of risk of the transaction is provided, so that the OTP is made more convenient for the user.

Modification of Embodiment 2

Figure 19:
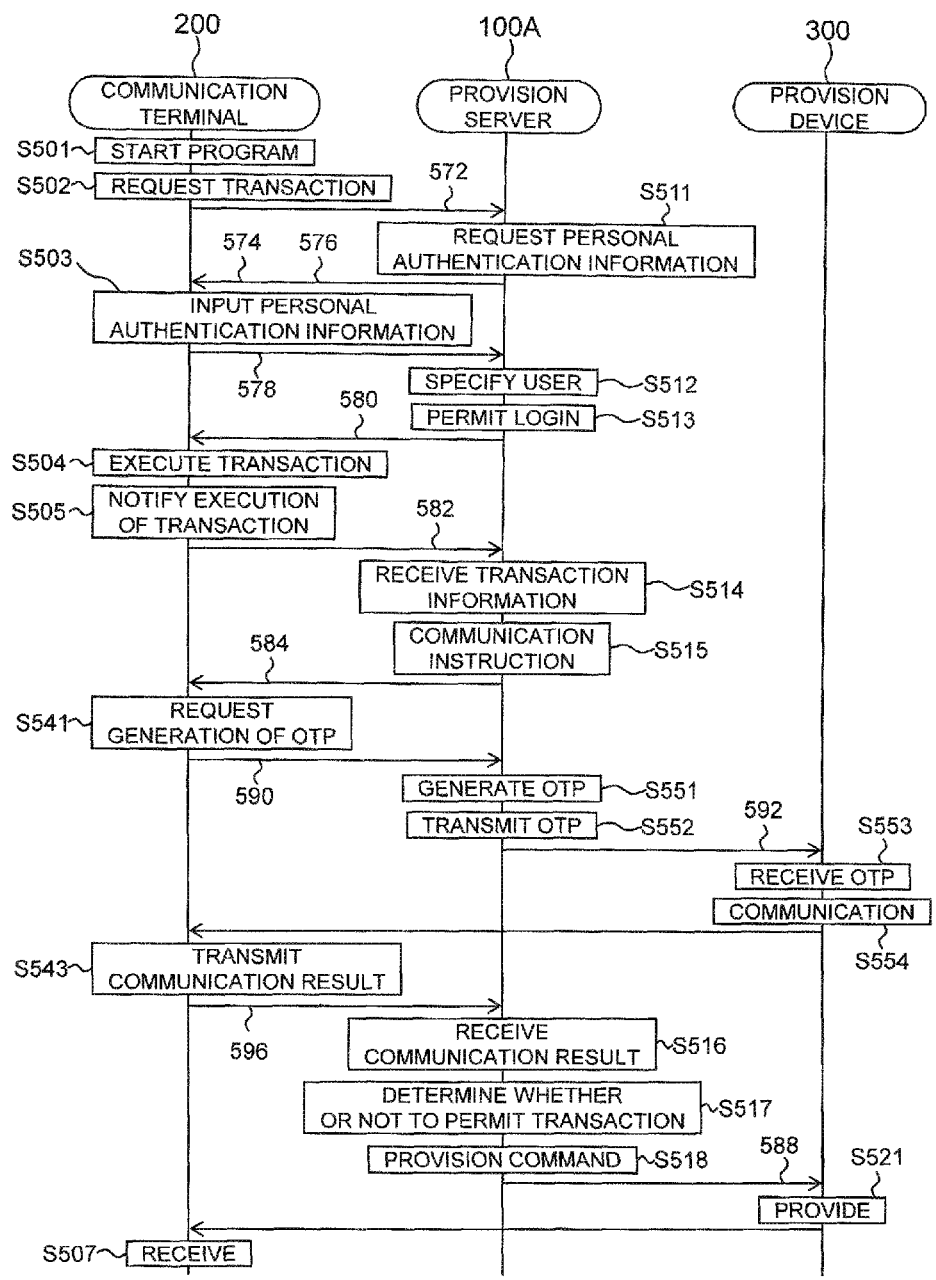
FIG. 19 is a flowchart showing an operation of a provision system in a modification of an embodiment according to the present invention.

With reference to FIG. 19, a provision system, and a server, a provision device and a communication terminal that are usable for the provision system, and also a program usable to operate the provision system, the server, the provision device and the communication terminal, all in a modification of embodiment 2 according to the present invention, will be described in detail. A provision system 21 in the modification of embodiment 2 determines whether or not to permit a transaction by use of an OTP, like the provision system 20 in embodiment 2.

The overview of the provision system 21, the hardware configuration of the provision server, the hardware configuration of the provision device, and the hardware configuration of the communication terminal usable in the modification of embodiment 2 are substantially the same as those of the provision system 20 in embodiment 2 and will not be described here. The functional structure of the provision server 100A in the provision system 21 is the same as the functional structure of the provision server 100A in the provision system 20 and will not be described here.

In the provision system 20 shown in FIG. 14, the provision server 100A transmits a generated OTP to the communication terminal 200. In the provision system 21 shown in FIG. 19, the provision server 100A transmits a generated OTP to the provision device 300. Namely, the OTP transmission unit 152 transmits an OTP generated by the OTP generation unit 150 to the provision device 300. The OTP transmission unit 152 may transmit the OTP as digitized data or encrypted data. In the case where the OTP is transmitted as encrypted data, the encrypted OTP and a key usable to decrypt the encrypted OTP may be transmitted separately.

Upon receipt of the OTP transmitted by the OTP transmission unit 152 by the provision device 300, the OTP is stored on the storage unit of the provision device 300. The OTP stored on the storage unit is used later to determine whether or not to permit the transaction, like in embodiment 2. A method for using the OTP to determine whether or not to permit the transaction will be described below in detail.

[Operation Flow of the Provision System 21]

FIG. 19 is a flowchart showing an operation of the provision system in the modification of an embodiment according to the present invention. The flowchart in FIG. 19 is similar to the flowchart in FIG. 14. In FIG. 19, the same operations as those in FIG. 14 bear the identical reference signs thereto. With reference to FIG. 19, the parts same as those of the operation flow in FIG. 14 will not be described, and the parts different from those of the operation flow in FIG. 14 will be described.

In FIG. 19, the login to the transaction system is made by substantially the same method as in the operation flow in FIG. 14. Unlike in the operation flow in FIG. 14, in the operation flow in FIG. 19, the destination of OTP transmission (S552) is the provision device 300, and inherent information specifying the communication terminal 200 is stored by the provision server 100A before the OTP is transmitted to the provision server 100A via the communication terminal 200. In the example shown in FIG. 19, inherent information of the communication terminal 200 is stored in advance on the provision server 100A. Namely, the inherent information of the communication terminal 200 is stored on the provision server 100A before the program is started in step S501.

The operation flow in FIG. 19 is substantially the same as the operation flow in FIG. 9 or FIG. 14 up to the step of communication instruction (S515). Thus, the steps after this step will be described. Upon receipt, by the communication terminal 200, of the communication instruction information 584 transmitted in step S515, the display 230 of the communication terminal 200 displays an interface usable to request OTP generation. Upon execution of the OTP generation request (step S541), the communication terminal 200 transmits an OTP generation request signal 590 to the provision server 100A.

Upon receipt of the OTP generation request signal 590, the provision server 100A generates an OTP (step S551) and transmits OTP information 592 including the generated OTP to the provision device 300 (step S552). At this point, the OTP generated in step S551 is stored on the server storage unit 120 of the provision server 100A. Upon receipt of the OTP information 592, the provision device 300 stores the OTP (step S553).

The OTP received by the provision device 300 (step S553) is transmitted to the communication terminal 200 by a communication between the communication terminal 200 and the provision device 300 (step S554). The communication terminal 200 generates a communication result including the OTP, and transmits a communication result 596 including the OTP to the provision server 100A (step S543).

Upon receipt of the communication result 596 by (S516), the provision server 100A determines whether or not to permit the transaction based on the transaction information 582 and the OTP included in the communication result 596 (step S517). Specifically, the OTP included in the communication result 596 and the OTP stored on the server storage unit 120 are compared against each other, and it is determined whether or not to permit the transaction.

In this case, the provision server 100A may acquire inherent information of the communication terminal 200 when receiving the communication result including the OTP from the communication terminal 200 and compare the acquired inherent information against the inherent information of the communication terminal 200 stored on the provision server 100A to determine whether the communication terminal 200 that executed the transaction is identical with the communication terminal 200 that transmitted the communication result including the OTP. Namely, the inherent information of the communication terminal 200 may be used in addition to the OTP to determine whether or not to permit the transaction, so that the level of security is improved.

The provision server 100A may store the inherent information of the communication terminal 200 at any time before the communication result is transmitted from the communication terminal 200 to the provision server 100A. For example, the inherent information of the communication terminal 200 may be included in the personal authentication information transmitted from the communication terminal 200 to the provision server 100A at the time of the transaction, or may be included in the OTP generation request signal transmitted from the communication terminal 200 to the provision server 100A at the time of the OTP generation request. Alternatively, the inherent information of the communication term 200 may be stored before the provision system is started.

As described above, the provision system 21 in the modification of embodiment 2 may use an OTP to determine whether or not to permit the transaction. In this case, it is merely needed that the communication terminal 200 and the provision device 300 are communicable with each other so as to transmit and receive data, and the do not need to have a function of transmitting the terminal identification information or the device identification information. It should be noted that the terminal identification information or the device identification information may be transmitted together with the OTP by the communication between the communication terminal 200 and the provision device 300.

Embodiment 3

With reference to FIG. 20 through FIG. 23, a provision system, and a server, a provision device and a communication terminal that are usable for the provision system, and also a program usable to operate the provision system, the server, the provision device and the communication terminal, all in embodiment 3 according to the present invention, will be described in detail. In embodiment 3, a provision device handling cash encompassing banknotes and coins as a provision item will be described. The provision device according to the present invention may be a device providing a user with a target item other than cash as a provision item. Examples of the provision item other than cash include tangible items such as a ticket, a coupon, a numbered ticket and the like, and intangible items such as a password, a procedure format, electronic money, an electronic ticket, client information and the like.

The overview of the provision system, the hardware configuration of the provision server, and the hardware configuration of the provision device usable in embodiment 3 are substantially the same as those of the provision system 10 in embodiment 1 and will not be described here. A provision system 10B in embodiment 3 performs personal authentication for the transaction by use of biological information to improve the level of security of the transaction. A provision server 100B in embodiment 3 has a different functional structure from that of the provision server 100 in embodiment 1. A communication terminal 200B in embodiment 3 has a different hardware configuration and a different functional structure from those in embodiment 1. Thus, the hardware configuration and the functional structure of the communication terminal 200B and the functional structure of the provision server 100B in embodiment 3 will be described here, and other configurations and structures will not be described.

[Hardware Configuration of the Communication Terminal 200B]

Figure 20:
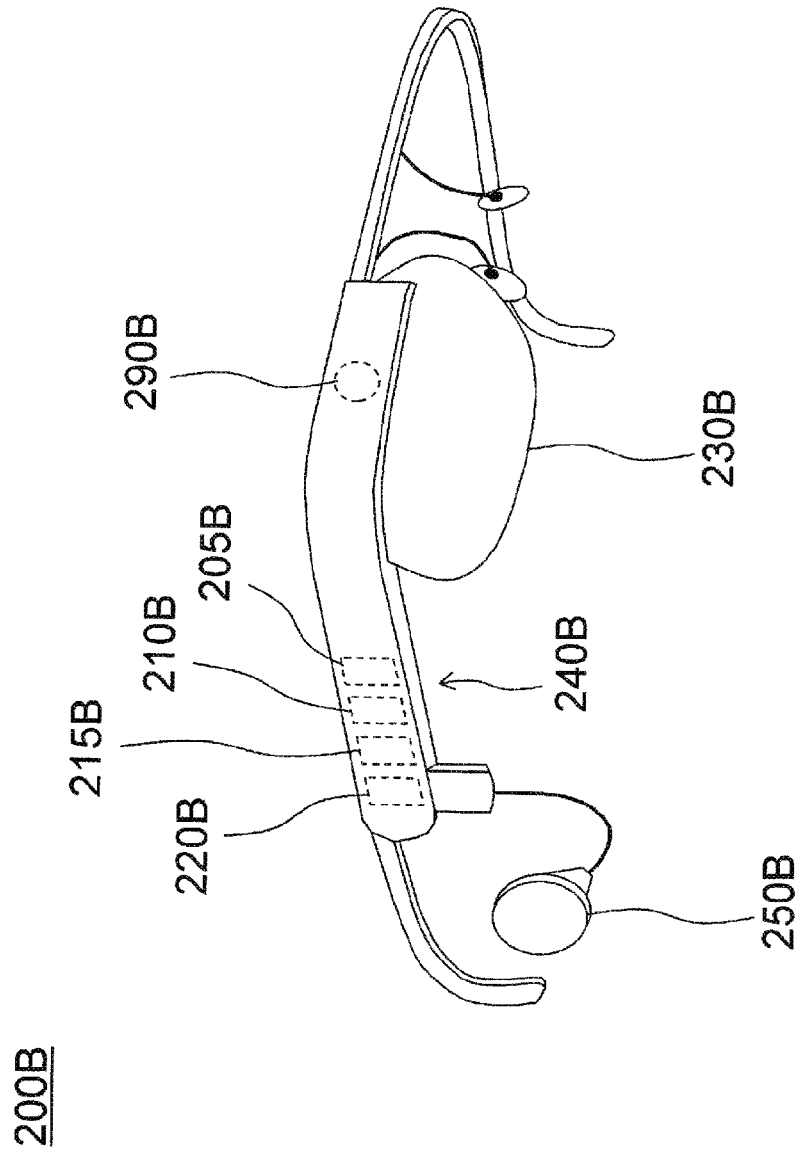
FIG. 20 is a schematic view showing a hardware configuration of a communication terminal usable for a provision system in an embodiment according to the present invention.

FIG. 20 is a schematic view showing a hardware configuration of the communication terminal usable for the provision system in an embodiment according to the present invention. As shown in FIG. 20, the terminal communication 200B is a wearable computer. FIG. 20 shows a glass-type computer as an example of wearable computer. The communication terminal 200B includes a terminal storage unit 205B, a terminal control unit 210B, a first terminal communication unit 215B, a second terminal communication unit 220B, a display 230B, an operation unit 240B, a speaker 250B, and a biological information acquisition unit 290B. The elements other than the display 230B, the operation unit 240B and the biological information acquisition unit 290B may be substantially the same as those in FIG. 5.

The display 230B may be a light-transmissive display device. Namely, a user using the communication terminal 200B visually recognizes the background through the display 230B. The display 230B may display an image in the entirety of an area thereof or may display an image only in a range visually recognizable by the user. Namely, the display 230B may display an image at a position corresponding to the eyes of the user wearing the communication terminal 200B. The display 230B may be a display device including a light-transmissive substrate, lines and transistors, or a projection-type display device.

The operation unit 240B includes a touch sensor. The operation unit 240B accepts an operation made by the user such as a flick, a tap or the like. It should be noted that the operation unit 240B may be of a button type. The operation unit 240B does not need to be included in the communication terminal 200B. In the case where the operation unit 240B is not included in the communication terminal 200B, the communication terminal 200B may communicate with an external device to accept an operation made by the external device.

The biological information acquisition unit 290B acquires user biological information on the user wearing the communication terminal 200B. The "user biological information" is information obtained by sensing a vital sign of the user such as the electrocardiogram, heart rate, heart rate variability, blood pressure, body temperature or the like, or a body character of the user such as the fingerprint, iris, retina, venous pattern, voiceprint, face or the like. In this example, the biological information acquisition unit 290B is an iris recognition camera. The iris recognition camera is an image sensor capturing an image of the iris pattern of an eye of a human at a high resolution. The iris pattern captured by the iris recognition camera is usable to distinguish the user having the captured iris pattern from other users by use of a pattern recognition technology. An example of the usable pattern recognition technology may be an MT system (Mahalanobis Taguchi System) of quality engineering usable for information processing.

[Functional Structure of the Provision Server 100B]

Figure 21:
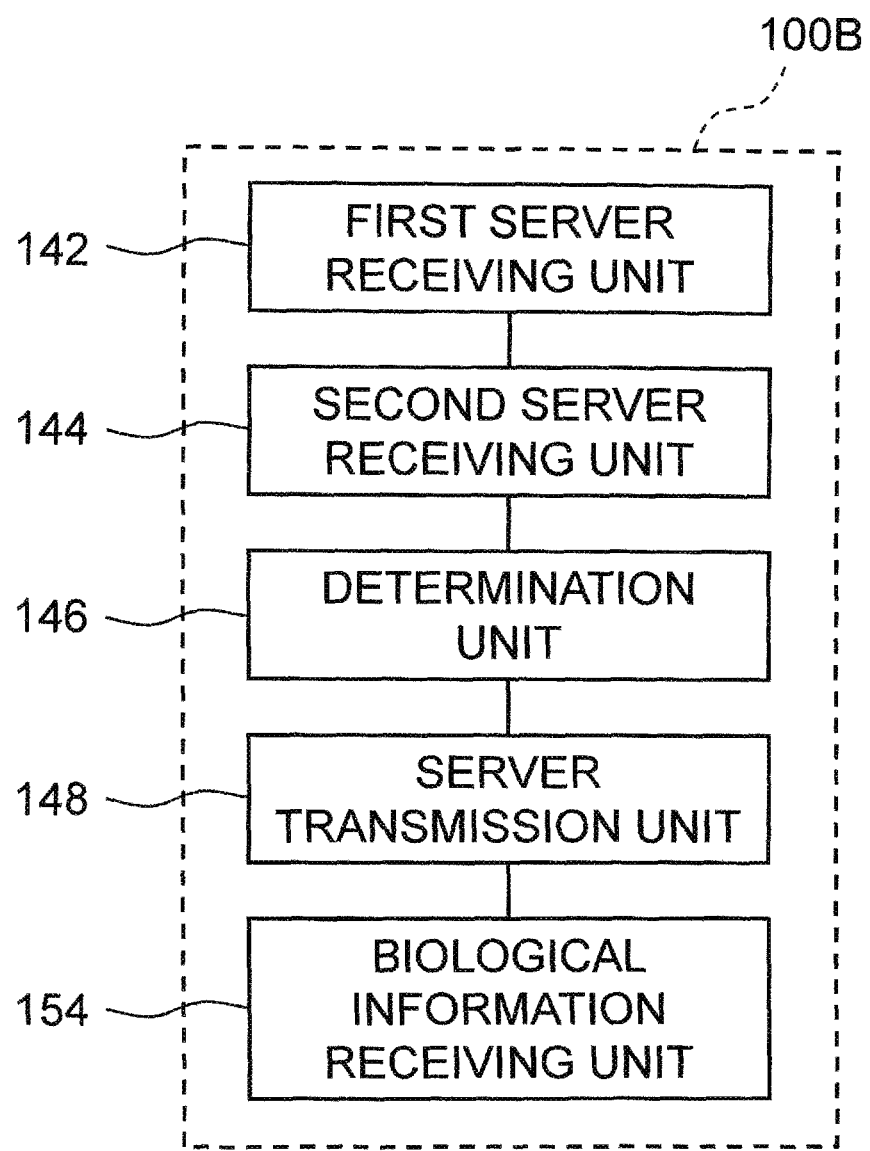
FIG. 21 is a block diagram showing a functional structure of a server usable for the provision system in an embodiment according to the present invention.

FIG. 21 is a block diagram showing a functional structure of the server usable for the provision system in an embodiment according to the present invention. As shown in FIG. 21, the provision server 100B includes the first server receiving unit 142, the second server receiving unit 144, the determination unit 146 and the server transmission unit 148, and also includes a biological information receiving unit 154. The elements other than the biological information receiving unit 154 may be substantially the same as those in FIG. 6.

The biological information receiving unit 154 receives user biological information acquired from the user by the communication terminal 200B. The biological information receiving unit 154 may include a pattern recognition circuit distinguishing different users from each other by use of the pattern recognition technology. The user biological information obtained by the biological information receiving unit 154 is transmitted from the communication terminal 200B to the provision server 100B at the time of the login to the transaction system. The user biological information used to log in to the provision system is also used later to determine whether or not to permit the transaction. A method for using the user biological information to determine whether or not to permit the transaction will be described below in detail.

[Functional Structure of the Communication Terminal 200B]

Figure 22:
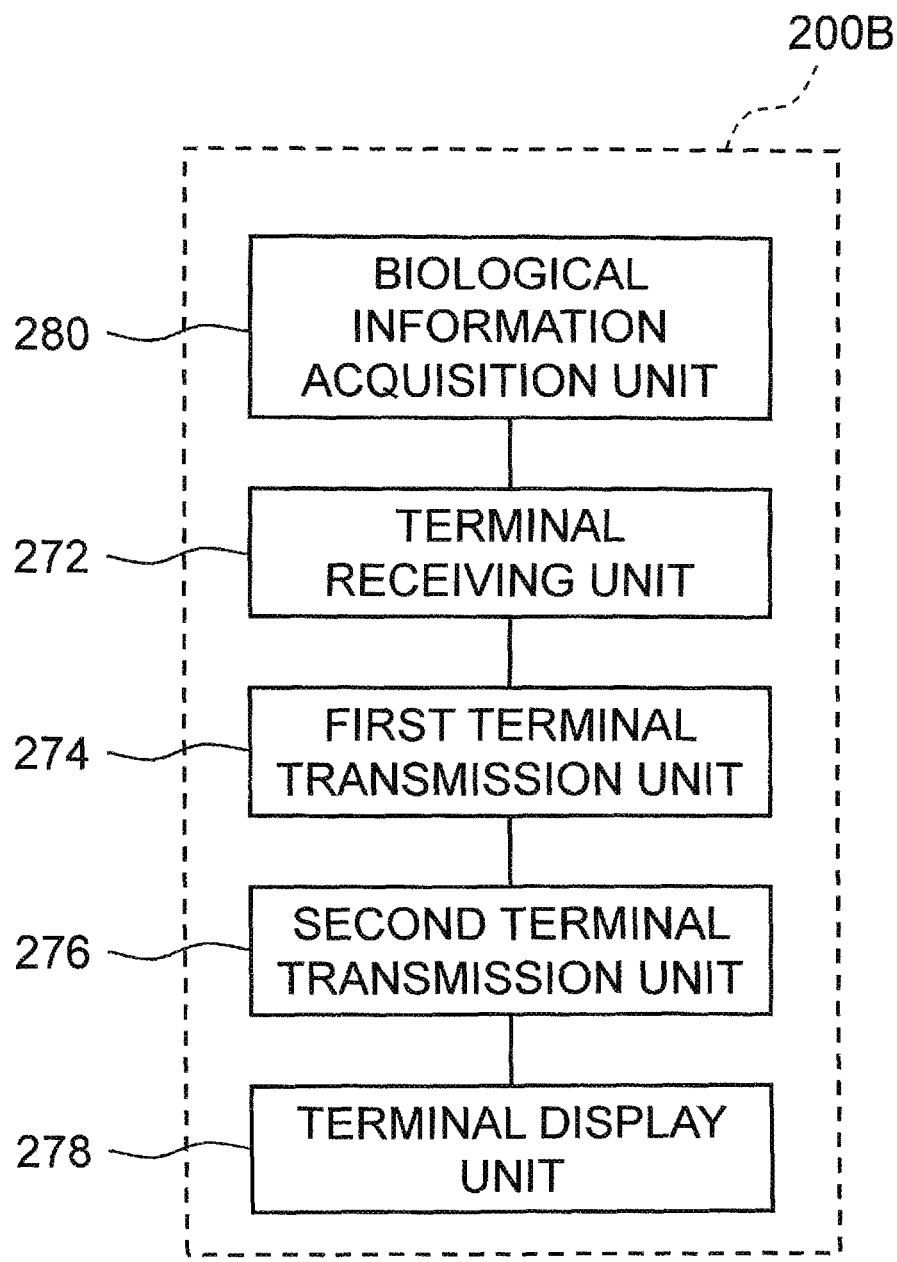
FIG. 22 is a block diagram showing a functional structure of the communication terminal usable for the provision system in an embodiment according to the present invention.

FIG. 22 is a block diagram showing a functional structure of the communication terminal usable for the provision system in an embodiment according to the present invention. As shown in FIG. 22, the communication terminal 200B includes the terminal receiving unit 272, the first terminal transmission unit 274, the second terminal transmission unit 276 and the terminal display unit 278, and also includes a biological information acquisition unit 280. The elements other than the biological information acquisition unit 280 may be substantially the same as those in FIG. 8.

The biological information acquisition unit 280 senses the body of the user wearing the communication terminal 200B to acquire the user biological information. The sensing of the body is performed in response to a personal authentication information request. Namely, one piece of user biological information is acquired for one personal authentication information request.

It should be noted that the biological information acquisition unit 280 may sense the body of the user periodically to acquire the user biological information continuously. Namely, the biological information acquisition unit 280 may acquire the user biological information continuously in one, same session after the login to the transaction system. The expression "in one, same session" indicates that the login state to the transaction system is maintained, and may be rephrased as "in the session validity term".

In the case where the biological information acquisition unit 280 acquires the user biological information continuously, pattern recognition may be executed at each time of sensing to specify the user. Namely, in the case where another user puts on the communication terminal 200B during the transaction, the user biological information sensed before the replacement of the user is different from the user biological information sensed after the replacement of the user. Therefore, it is sensed by pattern recognition that the user has been replaced. Namely, the user biological information is acquired continuously in the same session, so that it is monitored that neither the validity of the login state of the user, nor the user himself/herself, has been changed.

[Operation Flow of the Provision System 30]

Figure 23:
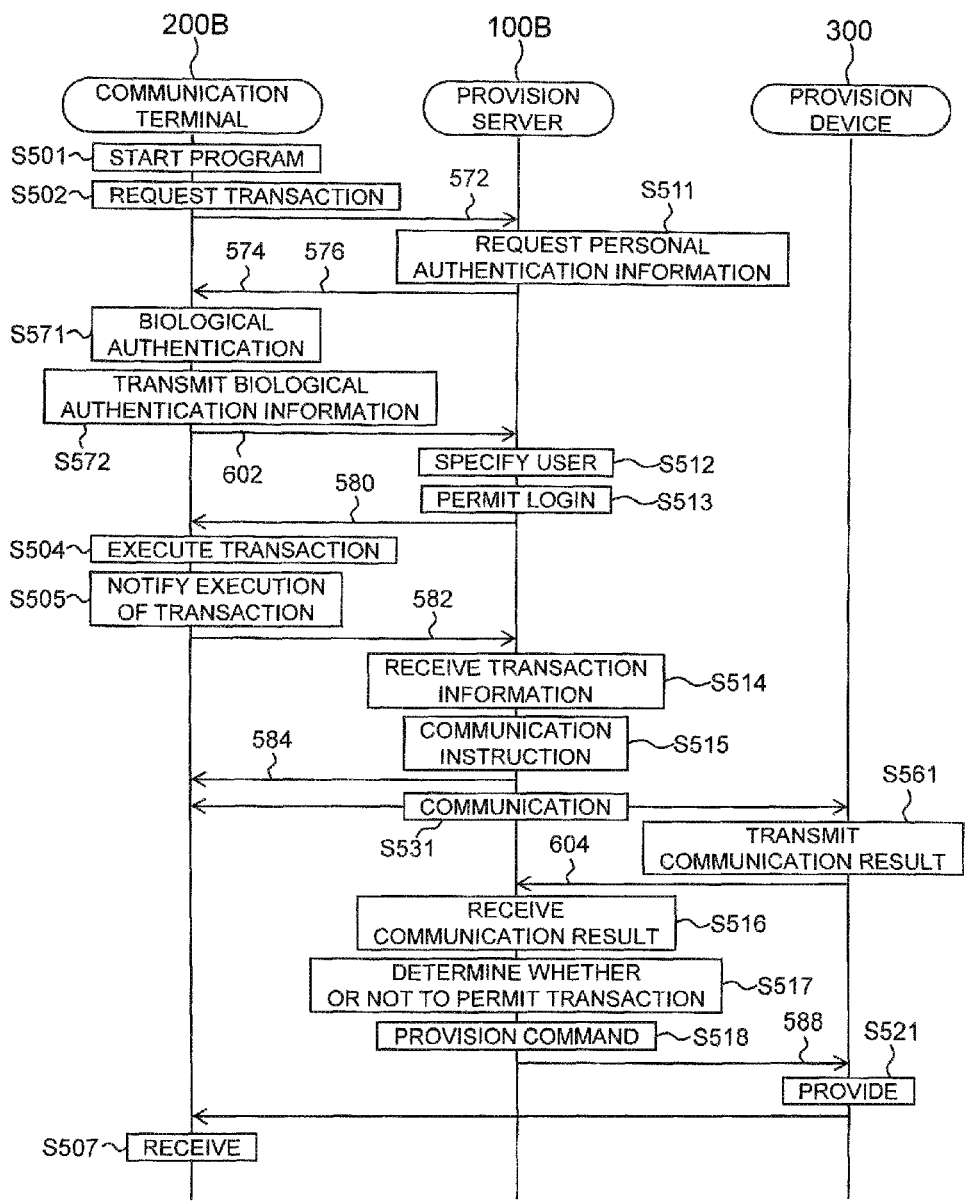
FIG. 23 is a flowchart showing an operation of the provision system in an embodiment according to the present invention.

FIG. 23 is a flowchart showing an operation of the provision system in an embodiment according to the present invention. The flowchart in FIG. 23 is similar to the flowchart in FIG. 14. In FIG. 23, the same operations as those in FIG. 14 bear the identical reference signs thereto. With reference to FIG. 23, the parts same as those of the operation flow in FIG. 14 will not be described, and the parts different from those of the operation flow in FIG. 14 will be described.

Upon receipt of the personal authentication information request signal 574 and the login interface provision signal 576 by the communication terminal 200B in step S511, the display 230B of the communication terminal 200B displays an interface requesting an agreement to the acquisition of biological authentication information. Upon execution of the acquisition of the biological authentication information (step S571), the communication terminal 200B transmits personal authentication information 602 including the user biological information to the provision server 100B (step S572).

Upon receipt of the personal authentication information 602, the provision server 100B permits the communication terminal 200B to log in to the transaction system based on the personal authentication information 602 including the user biological information (step S513).

The user biological information used to log in to the transaction system is stored on the terminal storage unit 205B of the communication terminal 200B and on a server storage unit 120B of the provision server 100B. The user biological information stored on the terminal storage unit 205B is transmitted to the provision device 300 by the communication in step S531, and the provision device 300 generates a communication result including the user biological information. The communication result 604 including the user biological information is transmitted from the provision device 300 to the provision server 100B (step S561).

Upon receipt of the communication result 604 (step S516), the provision server 100B determines whether or not to permit the transaction based on the transaction information 582 and the user biological information included in the communication result 604 (step S517). Specifically, the user biological information included in the communication result 604 and the user biological information included in the personal authentication information 602 stored on the server storage unit 120B are compared against each other, and it is determined whether or not to permit the transaction. In the case where the user biological information stored on the server storage unit 120B of the provision server 100B and the user biological information included in the communication result 604 match each other in step S517, the transaction is permitted and cash is provided. By contrast, in the case where the user biological information stored on the server storage unit 120B and the user biological information included in the communication result 604 do not match each other in step S517, the transaction is rejected and the system is shut down.

In the case where the user biological information is continuously acquired in one, same session after the terminal 200B logs in to the transaction system as described above, when the user biological information is changed in the middle of the transaction, it may be determined that the user has been replaced and the system may be shut down.

As described above, the provision system 30 in embodiment 3 may use user biological information, used to log in to the transaction system (S513), to determine whether or not to permit the transaction (S517). In this case, it is merely needed that the communication terminal 200B and the provision device 300 are communicable with each other so as to transmit and receive data, and do not need to have a function of transmitting the terminal identification information or the device identification information. It should be noted that the terminal identification information or the device identification information may be transmitted together with the user biological information by the communication between the communication terminal 200B and the provision device 300.

As described above, the provision system 30 in embodiment 3 determines whether or not to permit the transaction by use of user biological information, which improves the level of security at the time of login to the transaction system, and thus provides an effect substantially the same as that of embodiment 1 even without having a function of transmitting the terminal identification information or the device identification information.

In the case where communication terminal 200B continuously acquires user biological information to continuously perform pattern recognition, it is sensed that the user using the communication terminal 200B has been replaced. Therefore, the provision system provides a high level of security.

In the above-described embodiments, the determination on whether or not to perform the transaction is made based on both of the transaction information and the communication result (that may include device identification information, terminal identification information, a one-time password or user biological information). The present invention is not limited to this. For example, in the case where the user information included in the transaction information and the user information included in the communication result match each other, the determination on whether or not to permit the transaction may be made based on either one of the transaction information and the communication result.

As described above, each of the provision systems described in the above-described embodiments is applicable to provision of an intangible item as well as the tangible item such as cash or the like. For example, such a provision system is applicable to provision of electronic data of a format required for money transfer to a foreign country. In this case, the communication terminal may be an electronic device capable of reading the format such as a smartphone, a tablet computer, a notebook computer or the like. Upon the transaction being permitted by a communication between the communication terminal and the provision device, the electronic data of the format is transmitted from the provision device to the communication terminal by use of the communication. The embodiments of the present invention are also applicable to provision of an intangible item such as an electronic ticket, electronic money or the like.

The present invention is not limited to any of the above-described embodiments, and may be appropriately altered without departing from the gist thereof.

A server or a provision device according to the present invention realizes a low-cost provision system capable of providing a provision item such as a tangible item, electronic data or the like, or realizes a provision system that requires a smaller number of operation steps to be made by a user.

What is claimed is:

1. A server, comprising:
   a first receiving unit receiving a transaction information transmitted by a communication terminal requesting a provision device having a provision item stored thereon to make a transaction of the provision item;
   a second receiving unit receiving a communication result including authentication information, the communication result being generated by a direct communication between the provision device and the communication terminal; and
   a transmission unit transmitting an instruction to execute the transaction to the provision device based on the transaction information or the communication result,
   wherein the transaction information is information on a transaction concluded by the communication terminal, and
   the direct communication is performed based on an instruction output upon receipt of the transaction information by the first receiving unit.

2. The server according to claim 1, further comprising a determination unit configured to determine whether or not to permit the transaction based on the transaction information or the communication result.

3. The server according to claim 2, further comprising:
   a one-time password generation unit configured to generate a one-time password in response to a one-time password generation request made by the communication terminal; and
   a one-time password transmission unit transmitting the one-time password to the communication terminal;
   wherein:
   the second receiving unit receives the one-time password received by the communication terminal via the provision device; and
   the determination unit determines whether or not to permit the transaction based on the transaction information or the one-time password.

4. The server according to claim 3, wherein the one-time password generation unit is configured to generate the one-time password having a one-time password length varying in accordance with the transaction information input by a user.

5. The server according to claim 3, wherein the one-time password generation unit is configured to generate the one-time password having a validity term varying in accordance with the transaction information.

6. The server according to claim 3, wherein the one-time password generation unit is configured to generate the one-time password having a validity term in accordance with a request made by the communication terminal.

7. The server according to claim 2, wherein:
   the communication terminal includes a biological information receiving unit receiving periodically user biological information acquired from a user of the communication terminal in the same session; and the determination unit is configured to determine whether or not to permit the transaction based on the transaction information or the user biological information.

8. The server according to claim 7, wherein the communication terminal is a wearable computer.

9. A server, comprising:
a first receiving unit receiving transaction information transmitted by a communication terminal requesting a provision device having a provision item stored thereon to make a transaction of the provision item;
a one-time password generation unit configured to generate, in response to a one-time password generation request made by the communication terminal, a one-time password having a length varying in accordance with the transaction information input by a user;
a one-time password transmission unit transmitting the one-time password to one of the communication terminal and the provision device;
a second receiving unit receiving the one-time password received by the one of the communication terminal and the provision device via the other of the communication terminal and the provision device; and
a transmission unit transmitting an instruction to execute the transaction to the provision device based on the transaction information or the one-time password.

10. A server, comprising:
a first receiving unit receiving transaction information transmitted by a communication terminal requesting a provision device having a provision item stored thereon to make a transaction of the provision item;
a one-time password generation unit configured to generate, in response to a one-time password generation request made by the communication terminal, a one-time password having a validity term varying in accordance with the transaction information;
a one-time password transmission unit transmitting the one-time password to one of the communication terminal and the provision device;
a second receiving unit receiving the one-time password received by the one of the communication terminal and the provision device via the other of the communication terminal and the provision device; and
a transmission unit transmitting an instruction to execute the transaction to the provision device based on the transaction information or the one-time password.

11. A server, comprising:
a first receiving unit receiving transaction information transmitted by a communication terminal requesting a provision device having a provision item stored thereon to make a transaction of the provision item;
a one-time password generation unit configured to generate, in response to a one-time password generation request and a validity term setting request made by the communication terminal, a one-time password having a different validity term;
a one-time password transmission unit transmitting the one-time password to one of the communication terminal and the provision device;
a second receiving unit receiving the one-time password received by the one of the communication terminal and the provision device via the other of the communication terminal and the provision device; and
a transmission unit transmitting an instruction to execute the transaction to the provision device based on the transaction information or the one-time password.

* * * * *